United States Patent [19]
Pelkey

[11] Patent Number: 6,017,273
[45] Date of Patent: *Jan. 25, 2000

[54] JOYSTICK GAME ADAPTER CARD FOR A PERSONAL COMPUTER

[75] Inventor: Michael H. Pelkey, Simi Valley, Calif.

[73] Assignee: Pacific Digital Peripherals, Inc., Simi Valley, Calif.

[*] Notice: This patent is subject to a terminal disclaimer.

[21] Appl. No.: 08/847,851

[22] Filed: Apr. 26, 1997

Related U.S. Application Data

[63] Continuation-in-part of application No. 08/625,519, May 26, 1996, Pat. No. 5,839,959.

[51] Int. Cl.$^7$ .................................................. A63F 9/24
[52] U.S. Cl. ............................................................. 463/36
[58] Field of Search ................................ 463/36, 37, 38; 341/50, DIG. 2; 323/283

[56] References Cited

U.S. PATENT DOCUMENTS 5,689,179  11/1997  Walker ................................... 323/283

*Primary Examiner*—George Manuel
*Attorney, Agent, or Firm*—Michaelson & Wallace

[57] ABSTRACT

The invention is embodied by game adapter card for interfacing between a host bus of a host central processing unit (CPU) and a game joystick including a variable resistor having a bias voltage input and a wiper output, the game adapter card including: a programmable resistor connected in series between the wiper output of the joystick and a voltage return terminal, an analog-to-digital converter (ADC) having a digital output and an analog input coupled to a connection point between the wiper output and the programmable resistor, apparatus for providing asynchronous data transfer from the digital output to the host bus and for rapidly programming said resistor with an optimal divider resistor value corresponding to a current joystick wiper output. The game adapter card can be backward compatible with existing game software by providing a default analog channel. The game adapter card of the invention can be connected to a multiple joystick controller including: an output connected to the joystick terminal of the game adapter card, an N:1 multiplexer having N data inputs, plural address inputs and a single output, the N inputs being individually connectable to respective wiper outputs of the N joysticks and apparatus for connecting one of the data inputs specified by the plural address inputs to the single output, and a cluster microcontroller for generating a sequence of address bytes applied to the plural address bits of the N:1 multiplexer.

24 Claims, 15 Drawing Sheets

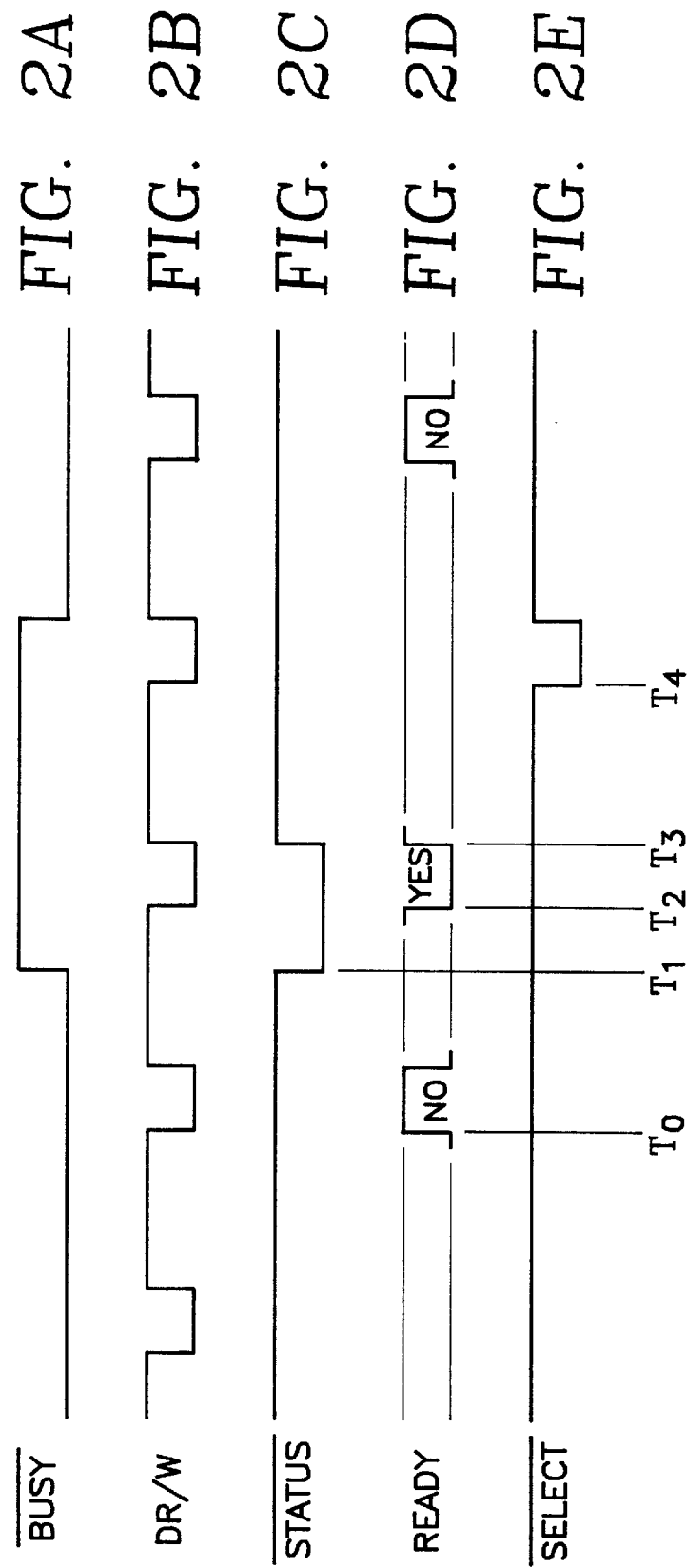

| STATUS BYTE | | | | | | | | |
|---|---|---|---|---|---|---|---|---|
| BIT NUMBER | | | | | | | | DATA ITEM |
| 7 | 6 | 5 | 4 | 3 | 2 | 1 | 0 | |
| | | | | | | | × | X AXIS DATA |
| | | | | | | × | | Y AXIS DATA |
| | | | | | × | | | R AXIS DATA |
| | | | | × | | | | Z AXIS DATA |
| | | | × | | | | | BUTTONS DATA |
| × | × | × | | | | | | NOT USED ALWAYS ZERO |

JOYSTICK GAME ADAPTER CARD FOR A PERSONAL COMPUTER

This application is a continuation-in-part of U.S. application Ser. No. 08/625,519 filed on May 26, 1996 by Michael H. Pelkey entitled, "Joystick Game Adapter Card for a Personal Computer," now U.S. Pat. No. 5,839,959.

BACKGROUND OF THE INVENTION

1. Technical Field

The invention is related to joysticks for operating games on personal computers and in particular to the game adapter card which provides the joystick interface in the personal computer.

2. Background Art

Many computer games require a so-called joystick for the user to interact with the game through a game adapter card that is installed inside the personal computer and provides the requisite interface between the joystick and the input/output (I/O) of the central processing unit (CPU) of the personal computer. Such a joystick typically includes a lever which can be moved in at least two dimensions (X and Y) and analog circuitry which provides an analog signal to the computer indicating the exact two-dimensional position of the lever. In some cases, there is a third dimension (Z, or out of plane) and even a fourth dimension (e.g., throttle position). In fact, the standard game format recognizes the four position analog signals and, in addition, four button inputs (on/off) which can be employed in robust game applications. In some cases, the X and Y position analog signals are produced by a steering wheel which functions in a manner similar to a joystick. For purposes of this application such a steering wheel is considered to be equivalent to the X and Y axis portions of a joystick.

Each of the four analog signals is produced by a respective potentiometer (inside the joystick housing) whose wiper is attached to the joystick lever and whose resistance element has a DC bias voltage (e.g., 5 volts) applied at one end.

In the industry standard game adapter card, the analog signal is converted to digital without requiring an analog-to-digital converter. This is accomplished by charging a capacitor through the portion of the joystick's resistance element selected by the wiper and observing the charging time required for the capacitor voltage to reach a predetermined voltage. The charging time is encoded as the width of a pulse transmitted to the CPU. The CPU counts the length of the pulse and deduces therefrom the level position. A constant charging voltage through the resistance element independent of wiper position is assured by letting one end of the resistance element float electrically.

The main disadvantage of encoding the joystick position as a pulse width is that the CPU cannot be interrupted any time that it is counting the length of the pulse-width encoded pulse from the game adapter card. The problem is that during this time the CPU is diverted from other necessary tasks such as rendering graphics for example, so that the entire game perceptibly slows down. The amount of time the CPU is thus diverted is a function of the joystick lever position: In a given dimension or axis, a minimum lever deflection produces a minimum pulse width and therefore monopolizes the CPU during counting for a minimum time, while the maximum lever deflection produces the longest pulse width and therefore monopolizes the CPU for the longest time. Any attempt to minimize this problem by reducing the pulse width range reduces the position resolution of the joystick. This problem is independent of the speed of the CPU and is the pacing factor in the speed of most games. In fact, the time to read the joystick position is the same whether the game is run on the earliest versions of a personal computer (e.g., those manufactured in 1986–1988) or the latest high speed personal computers (i.e., those being sold in 1996).

One object of the present invention is to provide a fast analog-to-digital converter on a game adapter card rather than the pulse width encoding of the industry standard game adapter card. In this case, the voltage received from the joystick wiper by the analog-to-digital converter would not vary linearly with wiper position, unless, in accordance with a further object of the invention, an external voltage divider resistor is connected in series with the internal resistance element of the joystick. However, a game adapter card having such a voltage divider resistor would not function as expected if another joystick were substituted having a resistance range significantly different from the original joystick. Thus, the game adapter card might have to be changed each time the user wished to change joysticks, which is not commercially practical. A yet further object of the invention is to solve the problem of having to modify the adapter card each time the joystick is changed.

A significant disadvantage of replacing the industry standard game adapter card's pulse width encoding circuitry with an analog-to-digital converter is that the resulting game adapter card would have very little use: The existing software game packages require the pulse width encoding format of a conventional game adapter card in order to run. Therefore, a game adapter card employing analog-to-digital conversion could not run software game packages until the industry could be persuaded to start producing software game packages compatible with an analog-to-digital conversion process on the game adapter card. Thus, it has not seemed feasible to improve the industry standard game adapter card. Another object of the invention is therefore to overcome the problem of lack of compatibility between the pulse width encoding legacy game packages and the digital high speed mode which is the primary object of the present invention.

SUMMARY OF THE INVENTION

In accordance with one aspect, the invention is embodied by game adapter card for interfacing between a host bus of a host central processing unit (CPU) and a game joystick including a variable resistor having a bias voltage input and a wiper output, the game adapter card including: a programmable resistor connected in series between the wiper output of the joystick and a voltage return terminal, an analog-to-digital converter (ADC) having a digital output and an analog input coupled to a connection point between the wiper output and the programmable resistor, apparatus for providing data transfer from the digital output to the host bus, apparatus for programming the resistance of the programmable resistor in accordance with the ideal divider resistor value for a current wiper output of the joystick. Preferably, the ideal divider resistor values for all wiper outputs of the joystick are stored in respective axis calibration registers for instant programming of the programmable resistor as each wiper output is sampled. Moreover, such values may be stored for different joystick models best matched by different divider resistor values. (An optional calibration feature changes the programmable resistor value whenever the digital output falls below a predetermined minimum digital value.) Preferably the apparatus for providing data transfer includes: a storage register for receiving digital values resulting from the digital output of the analog-to-digital converter, processor apparatus controlling the storage register independent of the host CPU for performing data transfer from the storage register to the host bus, the processor apparatus being responsive to a data transfer request from the host CPU for issuing a transfer ready acknowledgement, and a state machine for enabling the processor apparatus to perform the data transfer following a data transfer request from the host CPU and a corresponding transfer ready acknowledgement from the processor apparatus. Preferably, the processor apparatus issues the transfer ready acknowledgement provided that a current digital value in the storage register represents a change from its antecedent. The game adapter card can further include a device address decoder having an input port connected to the bus and an output flag bit connected to the state machine, the device address decoder setting the output flag bit in response to receipt on the host bus of a correct device address of the game adapter card, and wherein the state machine refrains from enabling data transfer by the processor apparatus without a setting of the output flag bit. Preferably, the state machine transmits a ready bit on the host bus contemporaneous with the data transfer request, the ready bit having a binary value representing the status of the of the transfer ready acknowledgement of the processor apparatus. The apparatus for incrementing and the processing apparatus can be included together in a microprocessor and wherein the microprocessor, the ADC and the storage register are included together in a microcontroller. The programmable resistor includes: a plurality of N resistors connected in series and where the $n^{th}$ one of the resistors has a resistance of $r2^n$, r being the resolution of the programmable resistor, a plurality of N shunt switches connected across respective ones of the N resistors. (For the optional calibration feature, an N-bit counter is provided having its outputs connected to corresponding ones of the switches, the N-bit counter having an input connected to the apparatus for incrementing.) A voltage shifter can be provided for shifting to about zero volts a minimum voltage of the connection point between the wiper output and the programmable resistor, wherein the predetermined minimum digital value is nearly equal to but greater than zero.

The game adapter card can be backward compatible with existing game software by providing a default analog channel which includes: a timer having a timer input and a timer output for producing a pulse signal at the timer output having a length corresponding to a resistance applied to the timer input, an analog/digital mode switch between the joystick wiper output and the connection point to the programmable resistor, the analog/digital mode switch having a first position connecting the wiper output to the connection point with the programmable resistor and a second position connecting the wiper output to the timer circuit, an analog output switch connecting the timer output to the host bus, and a controller responsive in the absence of a predetermined digital mode word on the host bus for disabling the apparatus for providing data transfer from the digital output, for triggering the timer and for activating the analog output switch. Preferably, the analog/digital mode switch is normally in the first position, the game adapter card further including a feedback connection from the timer output to a toggle input of the analog/digital mode switch for moving the analog/digital mode switch to the second position whenever the timer is triggered. The controller is responsive to the presence of the predetermined digital mode word on the host bus for enabling the state machine while disabling the analog output switch. A resume logic signal is output from the processor to the controller upon completion of each data transfer by the processor, the controller being responsive to the resume logic signal to disable the apparatus for providing data transfer. Preferably, the controller includes: an analog mode logic circuit having an analog write output connected to a trigger input of the timer asserted with a write signal of the host CPU, an analog read output connected to a control input of the analog output switch asserted with a read signal of the host CPU, and an enable output connected to the state machine for enabling the state machine with assertion of the digital mode word, a resume input for receiving the resume logic signal and a digital mode word flag input, and a digital mode word decoder having an input connected to the host bus and an output bit connected to the digital mode word flag input. (Preferably, the apparatus for carrying out the incrementing of the optional calibration feature has an inhibit input connected to the feedback connection for inhibiting the incrementing of the programmable resistor whenever the analog/digital mode switch is in the second position.)

In another aspect of the invention, a multiple joystick system simultaneously interfaces a plurality of as many as N joysticks with a host bus of a host central processing unit (CPU), each joystick including a variable resistor having a bias voltage input and a wiper output, the system including: a game card adapter including: a joystick terminal and a voltage return terminal and a programmable resistor connected in series between the joystick terminal and the voltage return terminal, an analog-to-digital converter (ADC) having a digital output and an analog input coupled to a connection point between the joystick terminal and the programmable resistor, apparatus for providing data transfer from the digital output to the host bus, apparatus for incrementing the resistance of the programmable resistor whenever the digital output falls below a predetermined minimum digital value, and a multiple joystick controller including: an output connected to the joystick terminal of the game adapter card, an N:1 multiplexer having N data inputs, plural address inputs and a single output, the N inputs being individually connectable to respective wiper outputs of the N joysticks and apparatus for connecting one of the data inputs specified by the plural address inputs to the single output, and a cluster microcontroller for generating a sequence of address bytes applied to the plural address bits of the N:1 multiplexer. Typically, each joystick includes four independent wiper outputs and the game adapter card includes four joystick terminals and four programmable resistors connectable thereto, the multiple joystick controller including: a total of four outputs individually connected to the four joystick terminals of the game adapter card, a total of four N:1 multiplexers each having N data inputs, plural address inputs and a single output, the N inputs of each of the four N:1 multiplexers being individually connectable to a respective one of the four wiper outputs of respective ones of the N joysticks, each N:1 multiplexer including apparatus for connecting one of the data inputs specified by the plural address inputs to the single output. In addition, each joystick typically includes four independent button outputs and wherein the game adapter card includes four button terminals, the multiple joystick controller further including: a total of four button outputs individually connected to the four button terminals of the game adapter card, a total of four N:1 button multiplexers each having N data inputs, plural address inputs and a single output, the N inputs of each of the four N:1 button multiplexers being individually connectable to a respective one of the four button outputs of respective ones of the N joysticks, each N:1 button multiplexer including apparatus for connecting one of the data inputs specified by the plural address inputs to the single output.

BRIEF DESCRIPTION OF THE DRAWINGS

FIGS. 2A through 2E are contemporaneous timing diagrams of waveforms employed in a state machine within the embodiment of FIG. 1.

DESCRIPTION OF THE PREFERRED EMBODIMENTS

Dual Mode Capability

The game adapter card of the present invention operates in two modes, one an analog mode compatible with existing game programs which require pulse width encoded data representing the joystick positions, and the other a high speed digital mode of the invention. Game programs designed to exploit the digital mode of the present invention identify themselves to the game adapter card by broadcasting on the host data bus a predetermined word which the game adapter card has been programmed to recognize. This word will be referred to hereinafter as the digital mode word, and preferably has the hexadecimal value of A5. The game adapter card of the present invention preferably responds to the same device address on the host address bus that conventional game adapter cards currently respond to, namely the hexadecimal value 201. When the game adapter card detects that its device address has been broadcast on the address bus, it operates either in the conventional analog mode or in the high speed digital mode depending upon whether the digital mode word has been broadcast on the data bus.

Digital Mode Structure

Figure 1A:
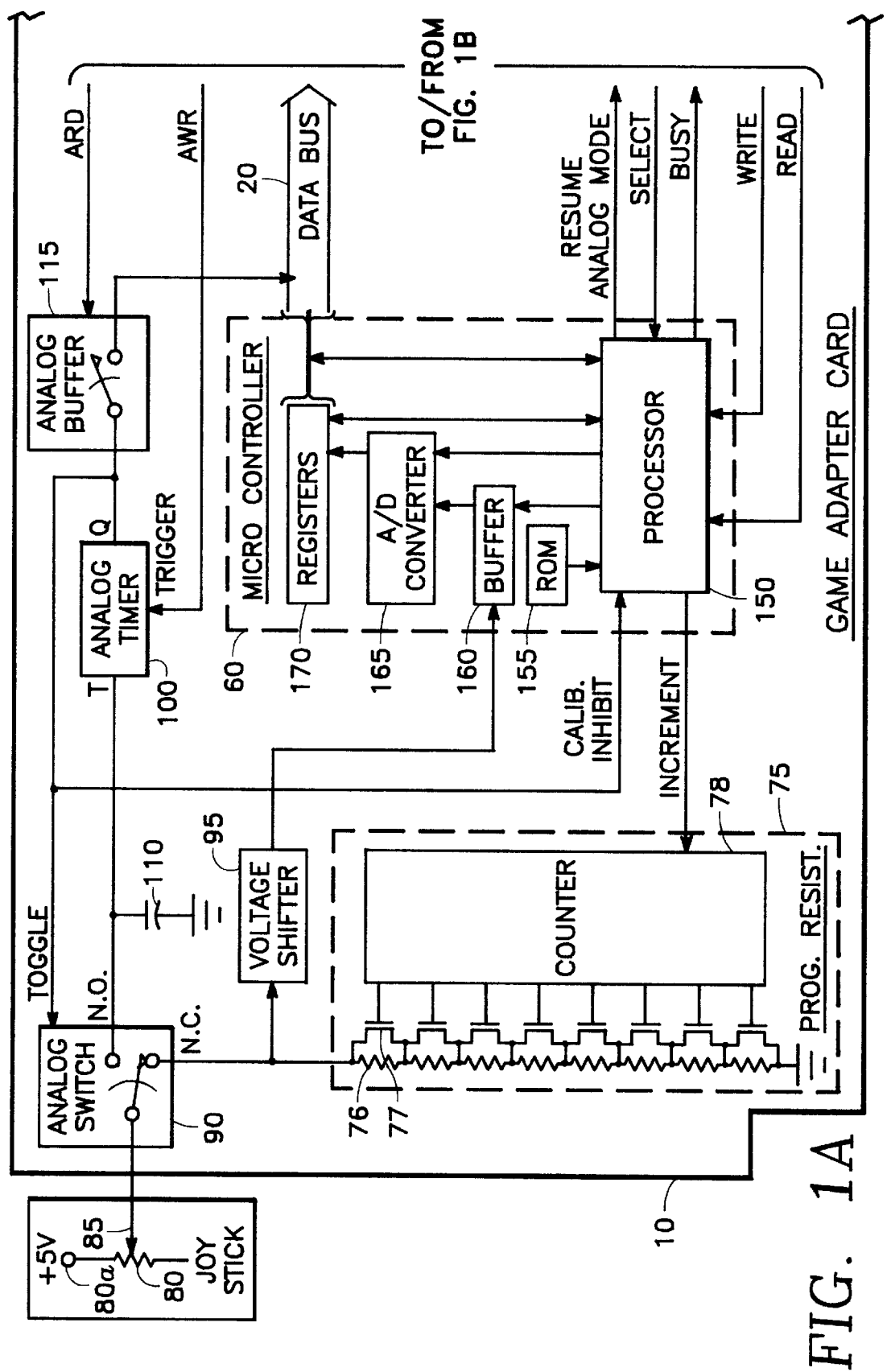
FIG. 1 is a schematic block diagram of a game adapter card in accordance with a preferred embodiment of the invention, but illustrating the processing of a only single axis position output of a joystick for the sake of simplicity.
Figure 1B:
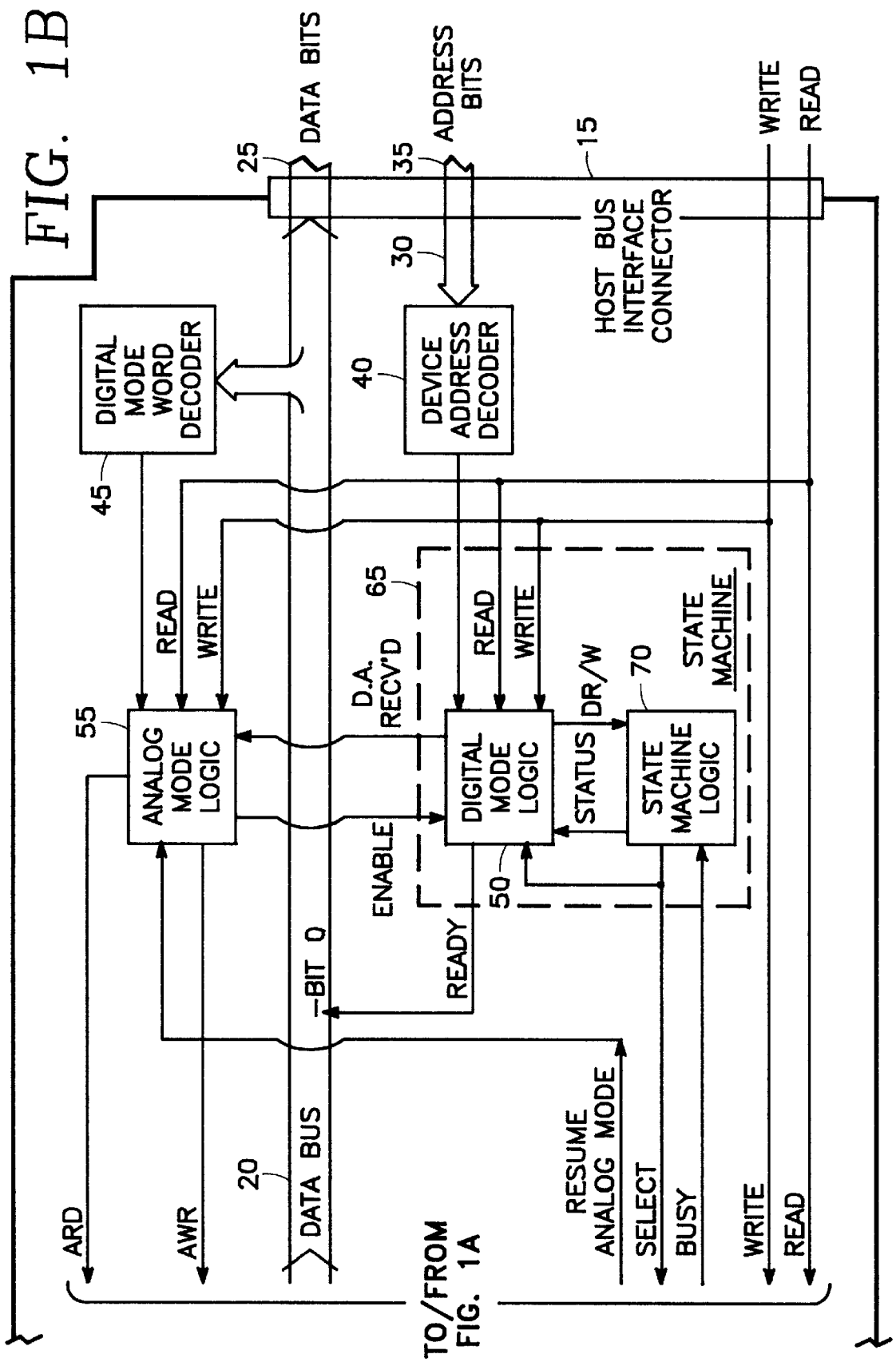

Referring to FIG. 1, a game adapter card 10 of the invention has a host bus interface connector 15 which connects the card 10 with the host CPU buses. The game adapter card has an internal data bus 20 connected to a host data bus 25 by the interface connector 15 and an internal address bus 30 connected to a host address bus 35 by the interface connector 15. A device address decoder 40 connected to the internal address bus 30 detects the presence on the address bus of the device address of the game adapter card (e.g., 201 hex). A digital mode word decoder 45 connected to the internal data bus 20 detects the presence of the digital mode logic word (e.g., A5 hex) on the data bus. The output bit of the device address decoder 40 is connected to an input of a digital mode logic circuit 50 while the output bit of the digital mode word decoder 45 is connected to an input of an analog mode logic circuit 55. The digital mode logic circuit 50 governs the operation of the game adapter card in the digital mode while the analog mode logic circuit 55 governs in the analog mode. A microcontroller 60 executes the tasks necessary to carry out the digital mode including fast analog-to-digital conversion of the position output signal from the joystick wiper 85. Asynchronous communication between the host CPU and the microcontroller 60 through the host bus interface 15 is governed by a state machine 65 which includes the digital mode logic circuit 50 and a state machine logic circuit 70. A programmable resistor 75 controlled by the microcontroller 60 provides a precision voltage divider resistance in series with a joystick resistance element 80 and joystick wiper 85 through a two-pole analog switch 90. The analog switch 90 has a normally closed position connecting the wiper 85 in series with the programmable resistor 75.

Accurate analog-to-digital conversion of the position output signal from the joystick wiper 85 is best obtained by maintaining an exact balance between the resistance of the programmable resistor 75 and the maximum resistance of the joystick resistive element 80. Such an exact balance produces the minimum voltage at the voltage divider junction 75a (between the wiper 85 and the programmable resistor 75) whenever the wiper 85 is at its maximum displacement along the resistive element 80 away from the 5 volt terminal 80a (i.e., maximum resistance). A voltage shifter 95 such as an operational amplifier is preferably employed to shift that minimum voltage to zero volts to provide a more ideal range from zero volts to some finite maximum voltage (e.g. 5 volts). With this feature, the desired resistance balance is maintained and an optimal dynamic range of analog-to-digital conversion is obtained by requiring that the range of digital values produced by the analog-to-digital conversion have a minimum close to but above zero (preferably, 1) whenever the wiper 85 is at its maximum displacement along the resistive element 80 away from the 5 volt terminal 80a. This is achieved by initializing the programmable resistor 75 at a resistance less than the joystick resistive element 80 and then programming the microcontroller 60 to simply increment the resistance of the programmable resistor 75 by one unit (e.g., 1.5 kΩ) whenever a digital value below the minimum digital value (e.g., zero) is produced by the analog-to-digital conversion process. After a number of iterations, the precise resistor balance is achieved. This incrementing step is inhibited any time the game adapter card 10 is actually sending data in the analog mode by a CALIB INHIBIT signal discussed hereinbelow.

This feature not only optimizes the accuracy and dynamic range of the analog-to-digital conversion but also compensates for variations in the resistance of the joystick resistive element 80. (Such variations may occur because of temperature drift or because the user replaces the joystick.) As a result, the game adapter card 10 can be used with any one of a variety of joysticks with different resistive elements, a significant advantage.

As one example, the joystick bias terminal 80a is held at 5 volts DC so that the voltage at the divider terminal 75a swings from 5 volts to a minimum voltage of 2.5 volts as the wiper 85 moves to the maximum displacement away from the bias terminal 85a along the resistive element 85, and the voltage shifter 95 converts the resulting 2.5 to 5.0 volt range to a 0 to 5 volt range. The minimum digital value is chosen to be 1, the analog-to-digital conversion process has a resolution of 8-bits and converts the analog voltage range of 0 to 5 volts to a digital output range of 1 to 255.

In one implementation, the programmable resistor 75 consists of eight series resistors 76 individually shunted by eight respective switches 77 (e.g., field effect transistors), with their gates controlled by respective bits of eight-bit counter 78. The joystick resistive element 80 had a full-length resistance of R. The $n^{th}$ resistor 76 whose shunt switch 77 is controlled by the $n^{th}$ significant bit of the counter 78 had a resistance value $$r_n = 2^n \cdot [R'/255], \text{ where } R' > R.$$

For example, if R=370 kΩ, then R'/255 should be about 1.5 kΩ, in which case the programmable resistor 75 is incremented in 1.5 kΩ steps.

The microcontroller 60 preferably includes a program execution device such as a processor 150, a read-only memory (ROM) 155 storing the program instructions to be carried out by the processor 150, an analog signal input buffer 160 for storing analog voltages from the voltage shifter 95, and analog-to-digital converter 165 and output registers 170 for storing digital values generated by the analog-to-digital converter and digital values computed by the processor 150.

Analog Mode Structure

The game adapter card 10 also includes elements required in a conventional game adapter card including an analog timer circuit 100 and a capacitor 110. A buffer 115 (such as a tri-state buffer, for example) connects the output of the analog timer 100 to the internal data bus 20 under control of the analog mode logic circuit 55. The analog timer circuit 100 is triggered by the analog mode logic circuit 55. The analog switch 90 is toggled from its normally closed position (which is compatible with the digital mode of operation) to the opposite position connecting the wiper 85 to the capacitor 110 and analog timer 100 (for analog mode operations) whenever the output of the analog timer 100 is high.

Digital Mode Operation

The game adapter card 10 responds to the host CPU in the high speed digital mode if the host CPU asserts the digital mode word (e.g., A5 hex) on the address bus 25 while asserting the game adapter card's device address (e.g., 201 hex) on the address bus 35. (Otherwise, if the CPU asserts the game adapter card device address without asserting the digital mode word, the game adapter card 10 responds in its analog mode.) The assertion of the game adapter card's correct device address causes the output of the device address decoder 40 to go high, which is detected by the digital mode logic circuit 50. In response, the digital mode logic circuit 50 produces a logic high on its "D.A RECVD" output line to the analog mode logic circuit 55. In the meantime, assertion of the digital mode word (e.g., A5 hex) on the data bus has caused the output of the digital mode word decoder 45 to go high, which is detected by the analog mode logic circuit 55. In response to this, the analog mode logic circuit 55 produces a logic high on its ENABLE output line to the digital mode logic circuit 50, which enables the digital mode logic circuit 50 to begin the digital mode operations.

The operation of the microcontroller 60 will now be briefly introduced. The analog-to-digital converter 165 periodically samples the output of the voltage shifter 95 (through the buffer 160) at a certain sampling rate under control of the processor 150 to produce a corresponding succession of digital values, the n latest ones of which are stored in the registers 170 (where preferably n=8). The processor 150 continually watches for any change in the successive digital values. In order to not waste the host CPU's time, the microprocessor 150 maintains one of its output signals, BUSY, in a high state (meaning that there is no new information for the host CPU) until such time as the latest digital value output by the analog-to-digital converter 165 represents a change from the previous one. As will be described in greater detail below in this specification, the final digital value which the processor 150 monitors actually is not the value itself but rather involves a running average over the n last ones of the succession of digital values stored in the registers 170. Specifically, an average over the last n digital values is computed for each cycle of the analog-to-digital converter, so that there is an average value for each one of the eight digital values stored in the registers 170. A final value is computed as an average of the n latest average values. It is this final value that is monitored and is treated as the position value to be transmitted to the host CPU upon request. However, no communication between the processor 150 and the host CPU occurs until the BUSY signal is released to a logic low (signifying that the position value has changed).

The state machine logic 70 receives the BUSY signal. As long as BUSY is being asserted, the state machine logic circuit 70 sends a low STATUS to the digital mode logic circuit 50 so that, in response to a READ or WRITE signal from the host CPU, the digital mode logic circuit 50 transmits a logic high READY signal, signifying to the host CPU that the processor 150 is not ready to communicate. As soon as BUSY goes low, the state machine logic 70 raises its STATUS output to the digital mode logic circuit 50. The digital mode logic circuit 50 responds to this event as follows: Upon the next receipt of a high logic level on either the READ or WRITE inputs from the host bus interface 15, the digital mode logic circuit 50 transmits a logic high on its DR/W (digital read or write) output to the state machine logic and transmits a low READY signal (on the least significant bit on the internal data bus 20) for the duration of DR/W, which signifies to the host CPU that the processor 150 is preparing to transmit data on the data bus. The state machine logic 70, upon the next occurrence of DR/W, raises its SELECT output to the processor 150, enabling the processor to transmit the requested data on the data bus if READ is active. As soon as the data transfer is complete, the processor 150 raises its RESUME output to the analog mode logic circuit 55, signifying that the ENABLE signal is to be released so that the system is returned to the analog mode. The purpose of this latter feature is to be prepared for the possibility that the next assertion of the game adapter card device address may be from a conventional game program that requires the analog mode to be active to avoid an error.

The state machine 65 may be defined in terms of its operation, which is illustrated in the contemporaneous timing diagrams of FIGS. 2A through 2E. FIG. 2A illustrates the BUSY signal, FIG. 2B illustrates the DR/W signal, FIG. 2C illustrates the STATUS signal, FIG. 2D illustrates the READY signal which is transmitted on bit 0 of the data bus, and FIG. 2E illustrates the SELECT signal. As long as BUSY is being asserted, the digital mode logic circuit 50 responds to a READ signal from the host CPU by asserting READY as a logic high (signifying that the processor 150 is not ready (which occurs at time T0). STATUS is asserted as soon as BUSY is released, which occurs at time T1. READY is not asserted unless STATUS is asserted and not until DR/W is asserted, which occurs at time T2. Both READY and STATUS are released at the end of the active DR/W pulse, which occurs at time T3. The state machine 65 then remembers that the last READY signal was low (indicating the processor 150 is ready to communicate), and so upon the next assertion of DR/W, the state machine 65 asserts SELECT, which occurs at time T4 and endures for the duration of DR/W.

One feature of the state machine 65 is that the least significant bit (bit 0) of the data bus is time-shared among two uses, one to carry data (indicated by the shaded area of FIG. 2D and the other to transmit the READY signal telling the host CPU whether the processor 150 is ready to communicate (e.g., at time T0 and time T2, for example).

The operation of the processor 150 in carrying out the instructions stored in the ROM 155 may be summarized as follows:

1. Poll the analog input data in the buffer 160 for each joystick output (e.g., X, Y, R and Z axes) in synchronism with the sampling rate of the analog-to-digital converter 165.

2. For a given analog input (e.g., the X axis position of the joystick):

(a) compute an average value over the last N samples, (b) compute an average of the last N average values, (c) if the latter value is zero, increment the programmable resistor unless a CALIB INHIBIT signal is being asserted, (d) if the value represents a change, release BUSY, (e) if SELECT is high, then read or write previously specified data to the bus depending upon whether READ or WRITE is high, (f) assert RESUME to terminate digital mode upon the completion of the data transfer and continue with polling.

Figure 3A:
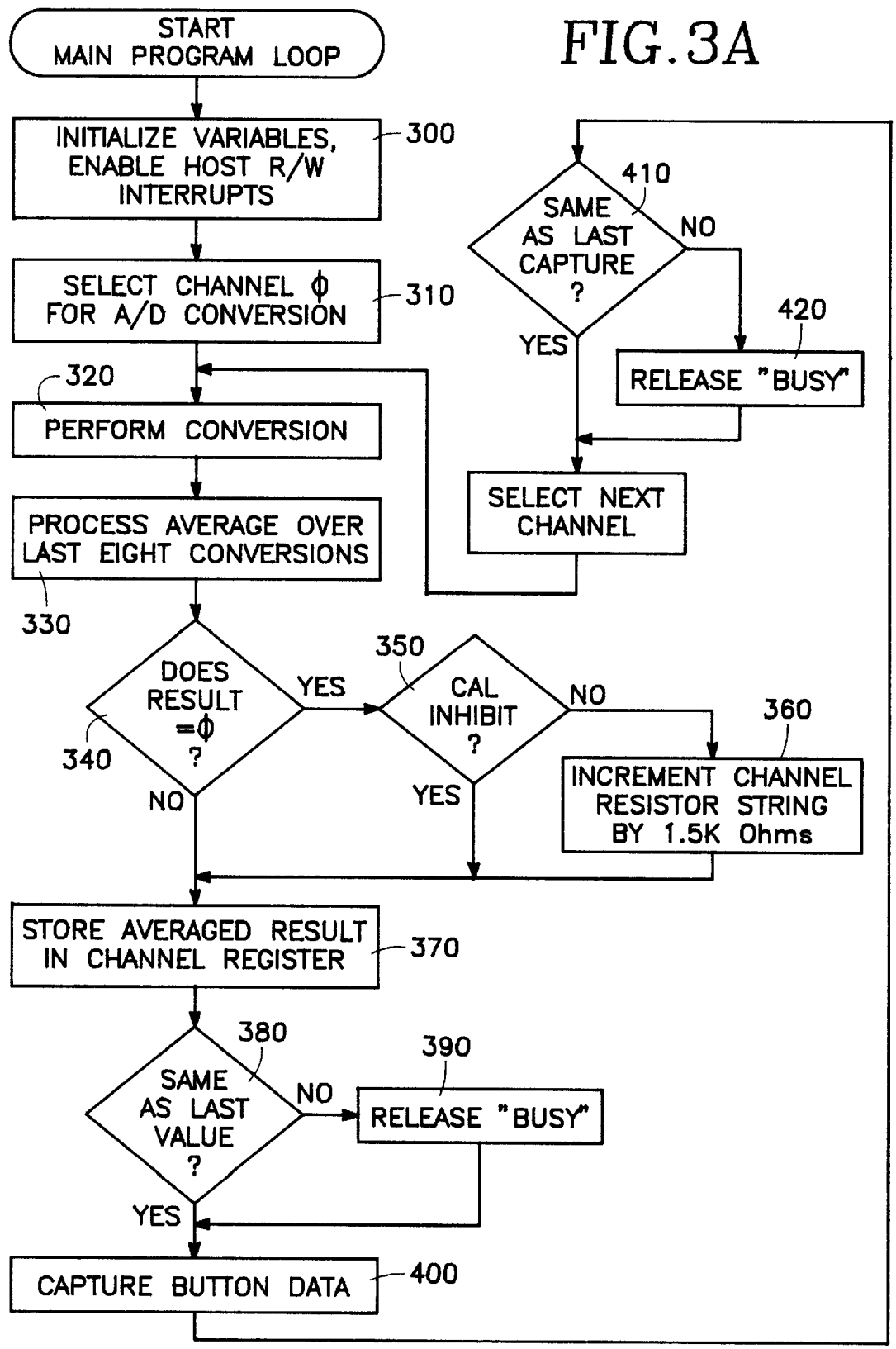
FIG. 3 is a flow diagram illustrating the operation of a micro-controller in the embodiment of FIG. 1.
Figure 3B:
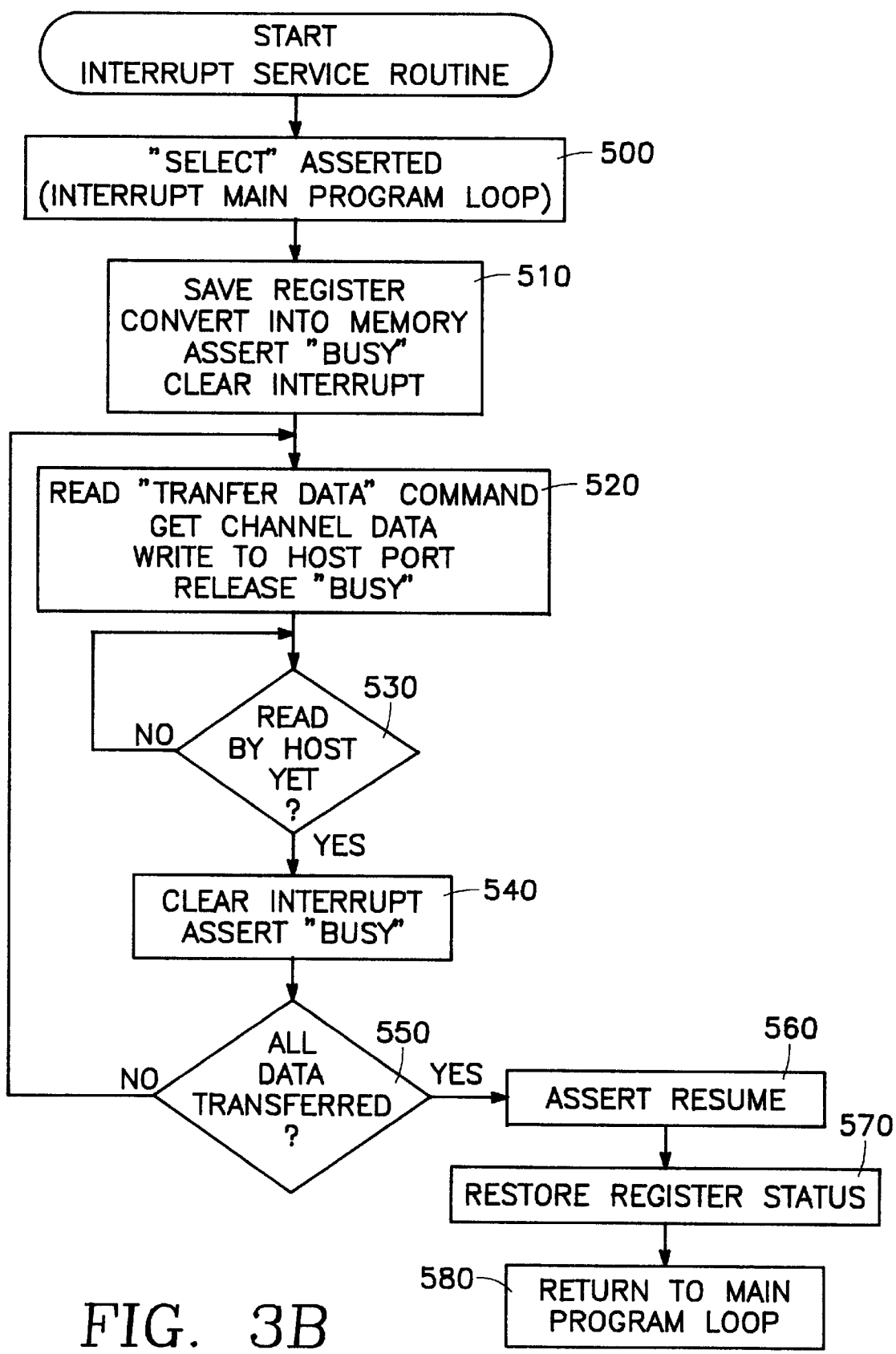

One embodiment of this operation is illustrated in the flow diagram of FIG. 3. The operation as defined by program instructions stored in the ROM 155 consists of a main program loop and an interrupt service routine. The main program begins with initializing variables and enabling host CPU read interrupts and write interrupts (block 300 of FIG. 3). One of the variables that is initialized could be the contents of the counter 78, which would be set to zero at this time. Polling begins by selecting the first one of the four analog channels (e.g., the X, Y, R and Z joystick axes signals) for analog-to-digital conversion (block 310). The analog-to-digital conversion is performed (block 320) and the averaging process described previously in this specification is performed (block 330). If the digital result is zero (YES branch of block 340), then the CALIB INHIBIT signal is checked (block 350). If the CALIB INHIBIT signal is not being asserted (NO branch of block 350), then the resistance of the corresponding programmable resistor is incremented (block 360). If the result is not zero (NO branch of block 340) or following the step of block 360, the averaged result is stored in one of the registers 170 (block 370). If the value is not the same as the value stored during the previous cycle (NO branch of block 380), then the BUSY signal is released (block 390). Otherwise (YES branch of block 380) or following the step of block 390, the joystick button data is polled and stored in the registers 170 (block 400). If the button data is not the same as the button data stored during the previous cycle (NO branch of block 410), then the BUSY signal is released (block 420). Otherwise (YES branch of block 410) or following the step of block 420, the next analog channel is selected for polling (block 430) and the program loops to block 320.

The interrupt service routine can occur at any step in the main program loop and is initiated upon SELECT being asserted to interrupt the main program loop (block 500 of FIG. 3). The next step is to save the contents of the registers 170 to memory and assert BUSY (block 510). The processor 150 then reads a command previously written by the host CPU requesting certain data, fetches that data, writes it to the data bus and then releases BUSY (block 520). This step can also include determining whether the READ flag or the WRITE flag is asserted by the host CPU. The processor 150 waits while the host CPU reads the data if the READ flag has been asserted or else receives data written by the host CPU into appropriate locations if the WRITE flag has been asserted (NO branch of block 530) and then re-asserts BUSY (block 540). If not all of the data specified in the command was transferred (NO branch of block 550), then the routine returns to the step of block 520. Otherwise (YES branch of block 550), the RESUME signal is asserted to terminate the digital mode and resume the analog mode (block 560). Then, the prior content of the registers 170 is fetched from memory and restored to the registers 170 (block 570) and the processor 150 returns to the main program loop (block 580).

Analog Mode Operation

The analog mode of operation is triggered by receipt on the address bus 35 of the correct device address of the game adapter card 10 unaccompanied by the digital mode word on the data bus 25. In this instance, the analog mode logic circuit 55 knows from the device addressed received (D.A.RECVD) signal from the digital mode logic 50 that the correct device address has been received. It also knows from the lack of assertion of the output of the digital mode word decoder 45 that the digital mode word has not been received on the data bus and therefore commences analog mode operations as follows:

Generally, the analog timer 100 holds the capacitor 110 at a predetermined voltage, preferably zero volts, by continually holding the ungrounded end of the capacitor 110 at ground potential. Analog mode operations begin with the analog mode logic circuit 55 asserting an analog write (AWR) signal (which tracks the WRITE signal at the host bus interface 15) to the trigger input of the analog timer 100. This causes the analog timer 100 to produce a logic high at its output Q, which in turn toggles the analog switch 90 to close to its normally open position, thereby connecting the ungrounded end of the capacitor 110 to the joystick wiper 85. Then, the analog timer 100 releases the ungrounded end of the capacitor 110 permitting it to be charged by the current from the wiper 85. At the same time, the analog mode logic circuit 55 asserts an analog read (ARD) signal (which tracks the READ signal at the host bus interface) to the tri-state buffer 115, in effect causing this buffer to connect the Q output of the analog timer 100 to the data bus 20. ARD constitutes a series of pulses and is controlled by the host CPU so that the host CPU can measure the length of time for the capacitor 110 to charge up to a predetermined voltage. The output of the tri-state buffer 115 is a series of logic ones, provided the output of the analog timer 100 remains at a logic high. The output of the analog timer 100 remains at a logic high until the capacitor 110 is charged up to the predetermined voltage, at which time the output of the analog timer 100 immediately returns to a logic low, producing a series of logic zeroes at the output of the tri-state buffer 115 to the data bus. The number of logic ones output from the tri-state buffer 115 specifies the corresponding joystick wiper position. The return of the analog timer output to a logic low causes the analog switch return to its normally closed position, disconnecting the capacitor 110 from the joystick wiper 85.

The Q output of the analog timer 100 not only toggles the analog switch 90 but also acts as the INHIBIT CALIB signal which instructs the processor 150 to refrain from incrementing the programmable resistor 75 at a time when it is disconnected from the joystick by the analog switch 90.

Four Channel Game Adapter Card

Figure 4A:
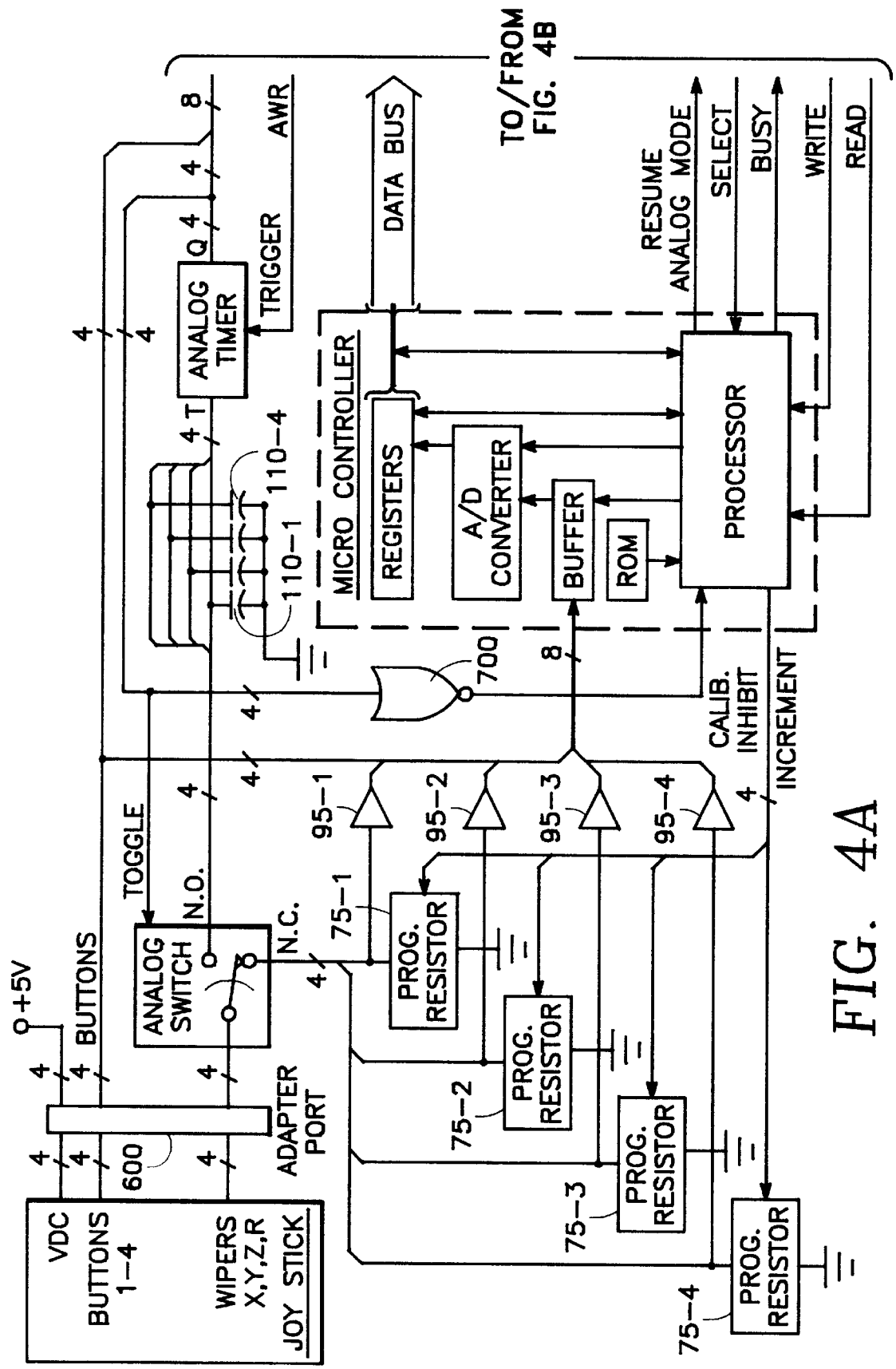
FIG. 4 is a schematic block diagram corresponding to FIG. 1 illustrating the processing of four axis position outputs and four button outputs of a joystick.
Figure 4B:
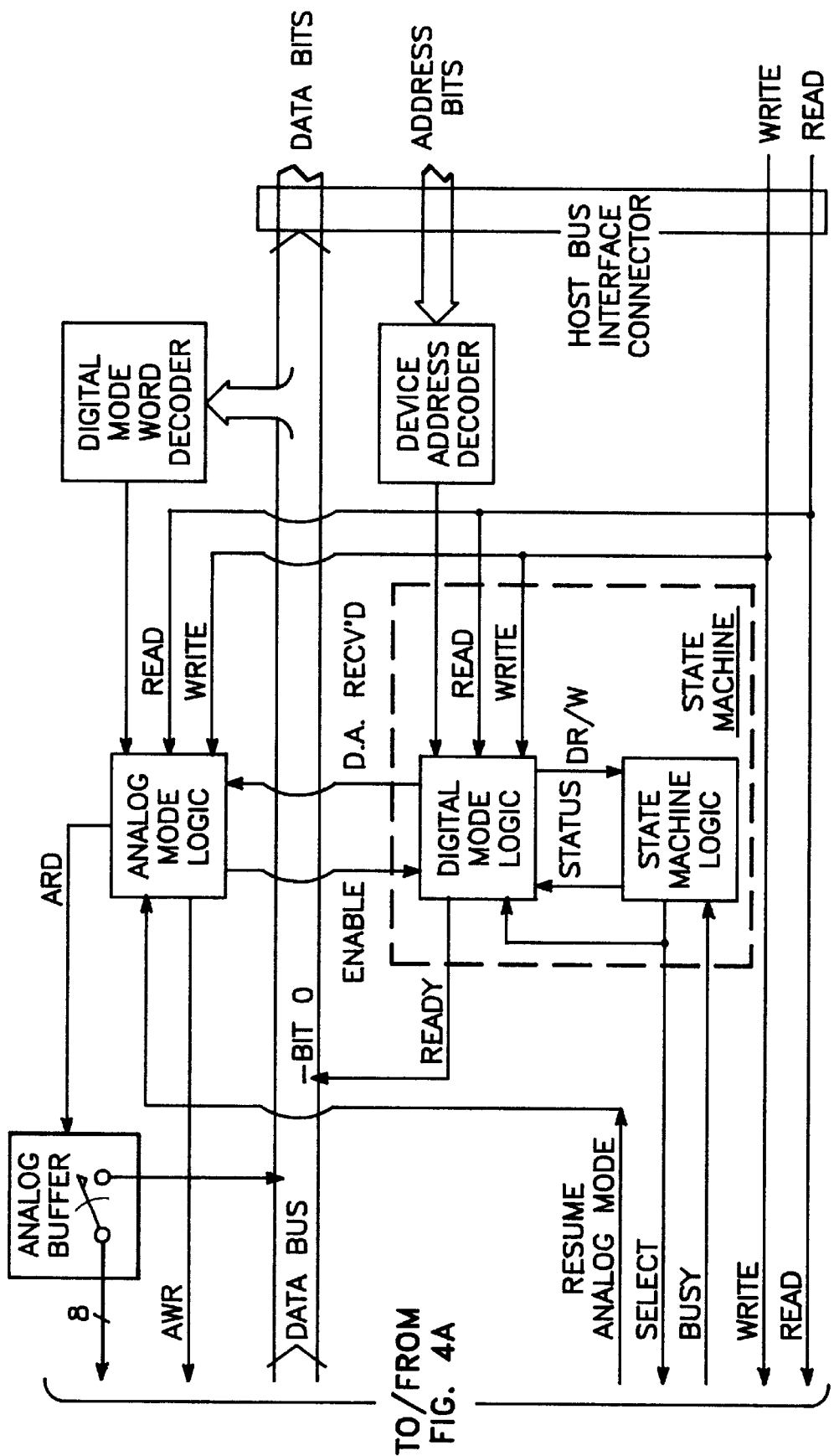

FIG. 4 illustrates more completely the game adapter card partially depicted in FIG. 1. In FIG. 4, there are four analog signal lines or channels from the joystick adapter port 600 and four button signal lines from the joystick adapter port 600. In addition, there are four capacitors 110-1 through 110-4 corresponding to the four analog channels. The four button channels are transmitted in parallel to the buffer 160 in the microcontroller 60 and to the tri-state buffer 115. All inputs and outputs of the analog switch 90 have four conductors, and so there are four programmable resistors 75-1 through 75-4 connected to the analog switch 90 with outputs connected to four voltage shifters 95-1 through 95-4. The four conductors of the analog timer 100 are combined in an OR gate 700 to produce the CALIB INHIBIT signal to the processor 150. The four position channels from the voltage level shifters 95-1 through 95-4 and the four button channels combine as an 8-channel input to the analog input buffer 160.

The number of programmable resistors could be reduced from four to one (eliminating three of the four programmable resistors 75-1 through 75-4 and three of the four voltage level shifters 95-1 through 95-4) and the microcontroller 60 could be programmed to time share the remaining single programmable resistor among the four joystick wiper outputs.

16 Joystick Cluster Controller

Figure 5:
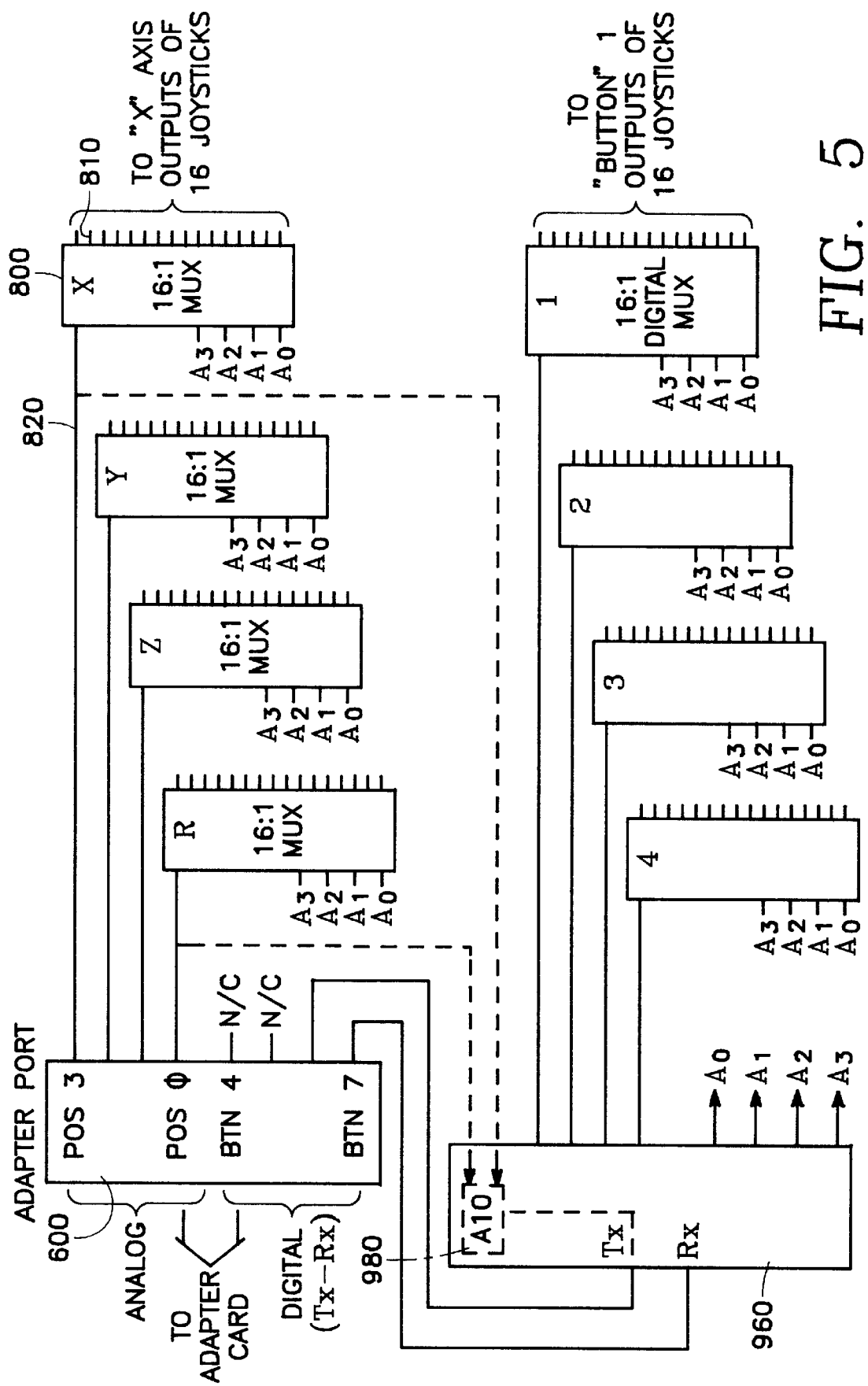
FIG. 5 illustrates a cluster controller in accordance with an alternative embodiment of the invention in which as many as sixteen joysticks are multiplexed simultaneously to the same adapter port of the game adapter card of FIG. 4.

FIG. 5 illustrates a cluster controller which multiplexes sixteen joysticks to the game adapter port 600 of FIG. 4. The four axis position outputs of the sixteen joysticks are multiplexed to the four position output lines of the adapter port 600 as follows: An X axis 16:1 multiplexer 800 has sixteen inputs 810 and a single output 820, the inputs being connected individually to the X axis outputs of sixteen joysticks. The X axis 16:1 multiplexer also has four address input bits $A_0$ through $A_3$ which select a specific one of the sixteen inputs 810 for connection to the output 820. There are a total of four 16:1 multiplexers 800, 830, 840, 850 with their inputs connected, respectively, to the X, Y, R and Z outputs of the sixteen joysticks, each multiplexer having a single output connected to one the four position data lines of the adapter port 600, and having four address input bits $A_0$ through $A_3$ specifying one of the sixteen inputs for connection to the single multiplexer output.

The four button outputs of the sixteen joysticks are multiplexed to the four button lines of the adapter port as follows: A button #16:1 multiplexer 900 has sixteen inputs 910 and a single output 920, the inputs being connected individually to the button #1 outputs of sixteen joysticks. The button #1 16:1 multiplexer also has four address input bits $A_0$ through $A_3$ which select a specific one of the sixteen inputs 910 for connection to the output 920. There are a total of four 16:1 multiplexers 900, 930, 940, 950 with their inputs connected, respectively, to the button #1, button #2, button #3 and button #4 outputs of the sixteen joysticks, each multiplexer having a single output connected to one the four button on/off data lines of the adapter port 600, and having four address input bits $A_0$ through $A_3$ specifying one of the sixteen inputs for connection to the single multiplexer output.

The four address input bits $A_0$ through $A_3$ could be controlled by the microcontroller 60 on the game adapter card. However, it is preferable that the cluster controller of FIG. 5 be independent and self-contained. Therefore, a microcontroller 960 is provided which generates the four address bits $A_0$ through $A_3$ in sequence and broadcasts them to the multiplexers. In order to provide communication with the adapter card microcontroller 60, the cluster microcontroller 960 uses the button lines of the adapter port 600 for communication. One of the button lines, labelled TX in FIG. 5 is dedicated to data transmitted by the cluster microcontroller 960 while another one of the button lines of the adapter port 600 is dedicated to data to be received by the cluster microcontroller 960. In order to transmit the button data, the microcontroller converts the parallel button data into serial data for transmission on the TX line. The adapter card microcontroller 60 could be programmed to send an inquiry on the RX lines to the cluster microcontroller 960 asking whether it is a cluster microcontroller. The adapter card microcontroller 60 could also transmit joystick selection commands on the TX line. The cluster microcontroller 960 could use the RX line to respond to the inquiry and to transmit the serial button data.

An additional feature is that the analog-to-digital conversion function could be performed in the cluster microcontroller 960 rather than the adapter card microcontroller 60. For this purpose the cluster microcontroller 960 can include an analog-to-digital converter 980 indicated in dashed line in FIG. 5. The digital data generated by the analog-to-digital converter could be transmitted on the TX line to the adapter card microcontroller 60. The outputs of the four position data multiplexers 800, 830, 840, 850 would be applied (through a buffer) to the input of the digital-to-analog converter 980 in a sequence determined by the address bits $A_0$ through $A_3$.

Time-Sharing a Single Programmable Resistor

Figure 6A:
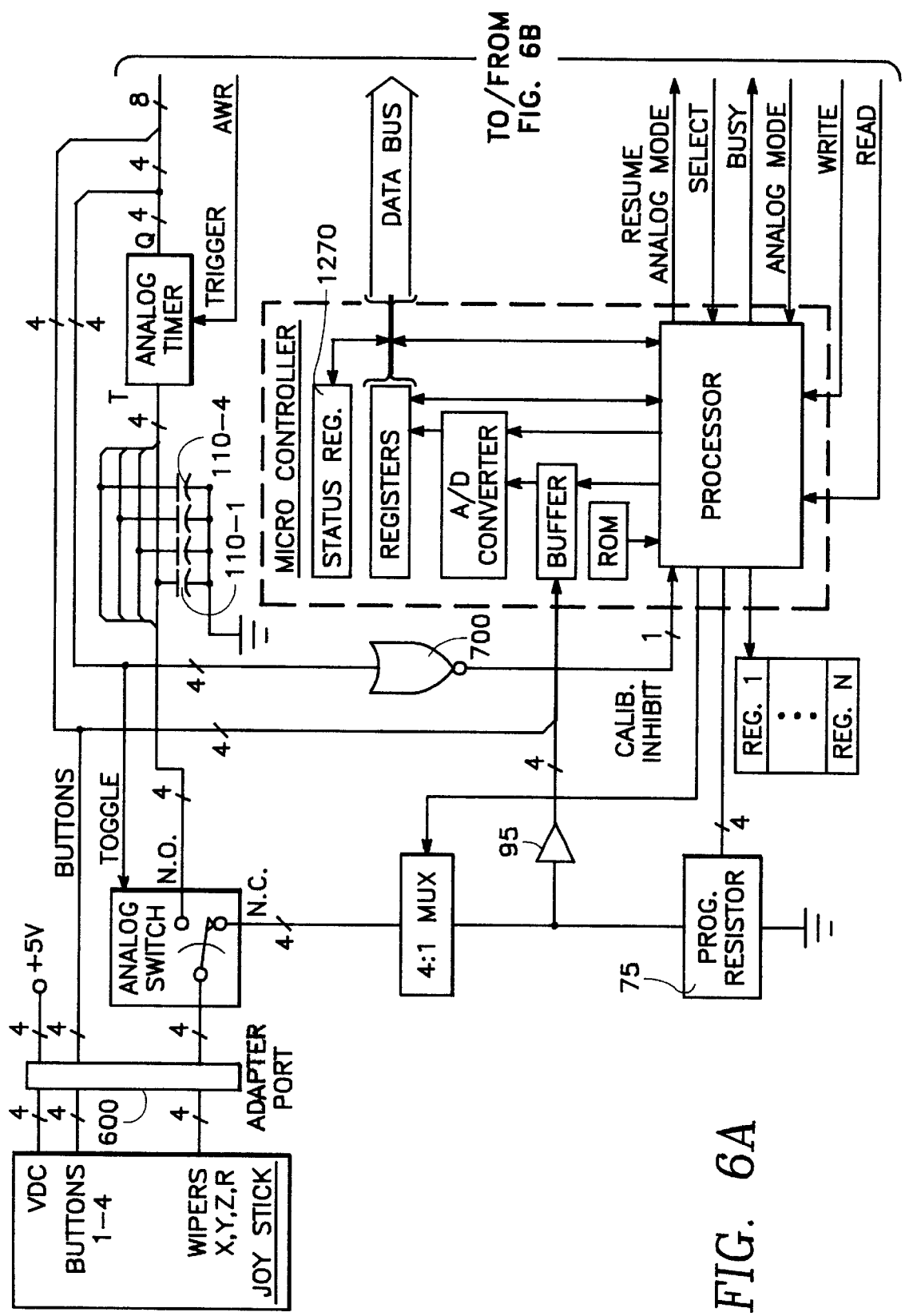
FIG. 6 is a schematic block diagram of the preferred embodiment of the adapter card of the present invention.
Figure 6B:
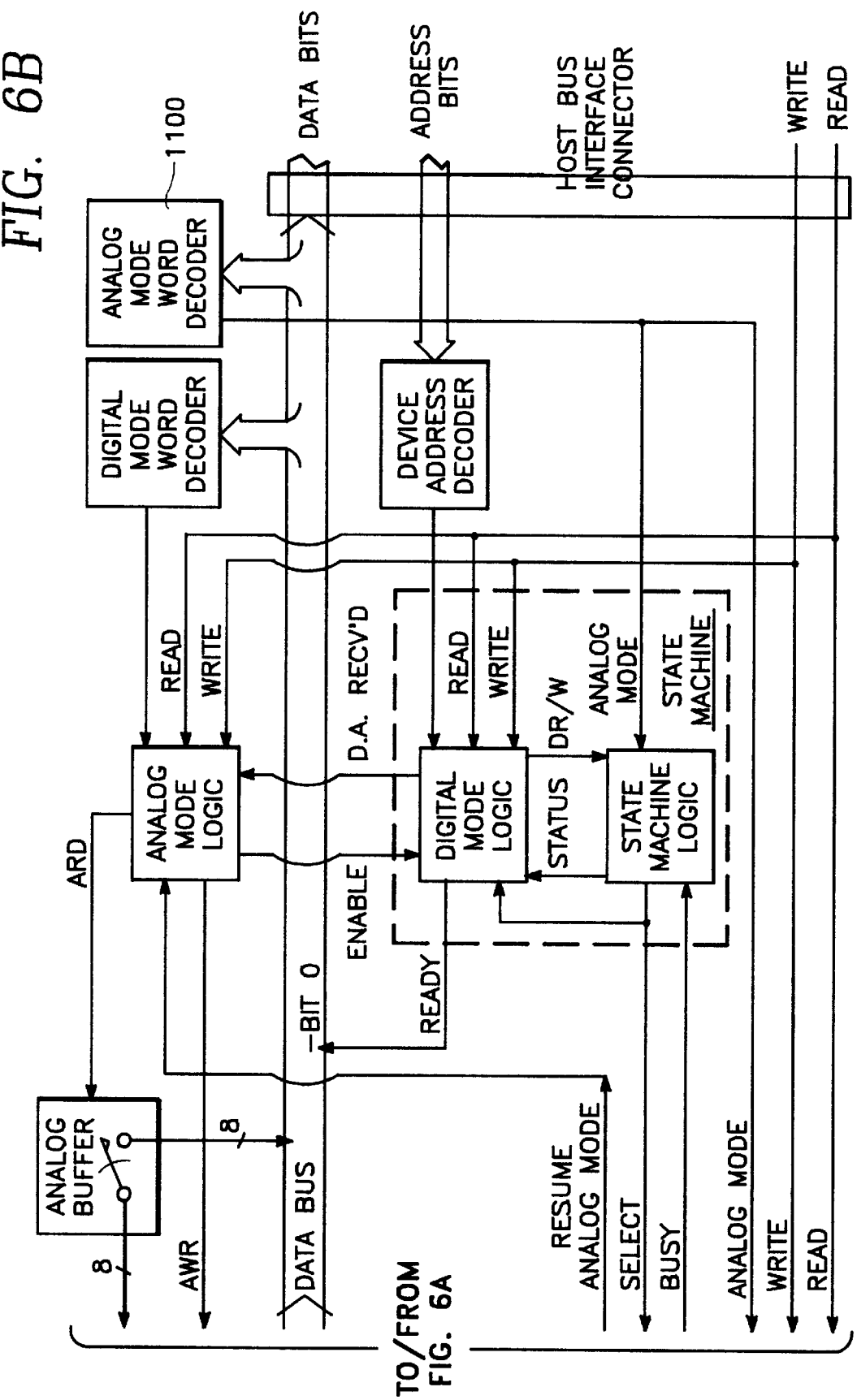

As mentioned previously in this specification with reference to FIG. 4, a single programmable resistor (rather than four programmable resistors 75-1 through 75-4) may be time-shared or multiplexed among the four joystick wiper outputs from the adapter port 600. Such an embodiment is illustrated in FIG. 6. In the embodiment of FIG. 6, a four-to-one multiplexer 1000 controlled by the processor 150 connects in rapid succession the single programmable resistor 75 to successive ones of the four joystick wiper analog outputs of the adapter port 600. Preferably, the processor 150 outputs a programmable resistor value to the single programmable resistor 75 directly to the single programmable resistor 75 via a multi-bit conductor 1005. The ideal divider resistor value for each one of the four joystick wiper outputs for the particular joystick being used has been previously determined (e.g., at the factory or by a calibration operation in the field). This ideal resistor value is permanently stored in one of four axis-calibration registers 1010, 1020, 1030, 1040 for rapidly reprogramming the single programmable divider resistor 75 as each successive one of the joystick wiper outputs is selected via the multiplexer 1000. As the processor 150 causes the multiplexer 1000 to select successive ones of the four joystick wiper outputs, it simultaneously resets the programmable resistor to zero resistance (to discharge any stray capacitance) and then instantly loads the appropriate resistor value from the corresponding one of the registers 1010–1040 into the programmable resistor 75.

In this embodiment, the auto-calibration feature described previously in this specification (in which the programmable resistor's resistance is incremented in accordance with an algorithm performed under certain circumstances) is preferably not employed. Thus, the counter 87 of FIG. 1 with which the auto-calibration of the programmable resistor 75 is carried out is not present in FIG. 6. However, calibration of the programmable resistor can be performed outside of the factory (if desired) using an internal counter function of the processor 150 in lieu of the counter 78 of FIG. 1.

If the multi-joystick embodiment of FIG. 5 is employed, then the number of axis-calibration registers must be increased beyond four to some number N. For example, if there are four joysticks multiplexed to the adapter port 600, each with four position axes/wipers, then sixteen resistor values must be stored, one for each wiper output, so that N is sixteen. In such an embodiment, the axis-calibration registers may be labelled from "register 1" through "register 16" as suggested in FIG. 6.

The joystick illustrated in FIG. 6 connected to the adapter port 600 may be replaced by any device having a position-measuring analog device consisting of a resistor 85 and a position wiper arm 85 or other potentiometer-like device, which may take the form of any other humanly-manipulatable device, which may take the form of a steering wheel, a track ball, an accelerator or throttle or pedal or lever or the like. Such potentiometer-like devices may not necessarily be joysticks, but the term "joystick" as employed in this specification is understood to refer to the broad genus including any analog signal output device employing a potentiometer-like element.

Bi-Directional Interface for Force-Feedback Communication

A more sophisticated joystick may be employed having a force-feedback servo 1050 (illustrated in FIG. 6) which exerts a force on the handle of the joystick which the user feels as a resistive or motive or vibrative force. To control the force-feedback servo 1050, the host computer sends force-feedback commands as data to the host bus. In order to accommodate the transmittal of such commands to the force-feedback servo 1050, the interface between the registers 170 and the data bus 20 is bi-directional, as is the interface between the interface between the registers 170, the buffer 160 and the adapter port 600. The processor 150 is programmed to recognize force-feedback commands from the host and to permit them to be written to the registers 170 and thence, via the buffer 160, written to unused pins of the adapter port 600. For this purpose, the processor 150 can bypass the analog to digital converter 165. As one example, one or more of the four button outputs (pins) of the adapter port 600 may not be used. In this case, the identity of the unused outputs (pins) are specified in software in the ROM 155 so that the processor 150 may employ a protocol for writing the force-feedback commands from host computer to the force-feedback servo 1050 via the unused pins, such as certain one or ones of the four button outputs. This provides an advantage over the prior art, which required an additional serial cable and port for communicating force-feedback commands.

Preferred Main Program for the Embodiment of FIG. 6

In the sequence discussed previously in this specification with reference to FIGS. 1, 2 and 3, the host was prevented from communicating data with the microcontroller 60 until a protocol involving the assertion and release of the BUSY signal was fulfilled that set the READY signal to a "yes" state that was read by the host computer. This imposed a delay in data communication when the digital mode was first entered (after leaving the analog mode). In accordance with the presently preferred embodiment, this delay is reduced or eliminated by the state machine 70 setting READY to its "yes" state (regardless of the state of the BUSY signal from the microcontroller 60) whenever the digital mode is to be terminated to begin an analog mode. For this purpose, a preferred protocol for the host computer is established in which the host computer not only asserts a "digital mode" word—hexadecimal A5— whenever it wishes to employ the high speed digital mode as described in previously herein, but also asserts an "analog mode" word, such as hexidecimal A4, whenever it needs to employ the analog mode (e.g., whenever an old or "legacy" game has been selected by the user). An analog mode word decoder 1100 is connected to the data bus 20 in the same manner as the digital mode word decoder 45. The analog mode word decoder has a single output bit ("ANALOG MODE") which is true whenever the analog mode word decoder 1100 senses the presence of the analog mode word (hex A4) on the data bus 20. The ANALOG MODE bit of the decoder 1100 is applied as an input to the state machine 70 and to the processor 150. A main program illustrated in FIG. 7, different from the one illustrated in FIG. 3, is preferably employed by the processor 150 in carrying out this more efficient embodiment of the invention.

Figure 7:
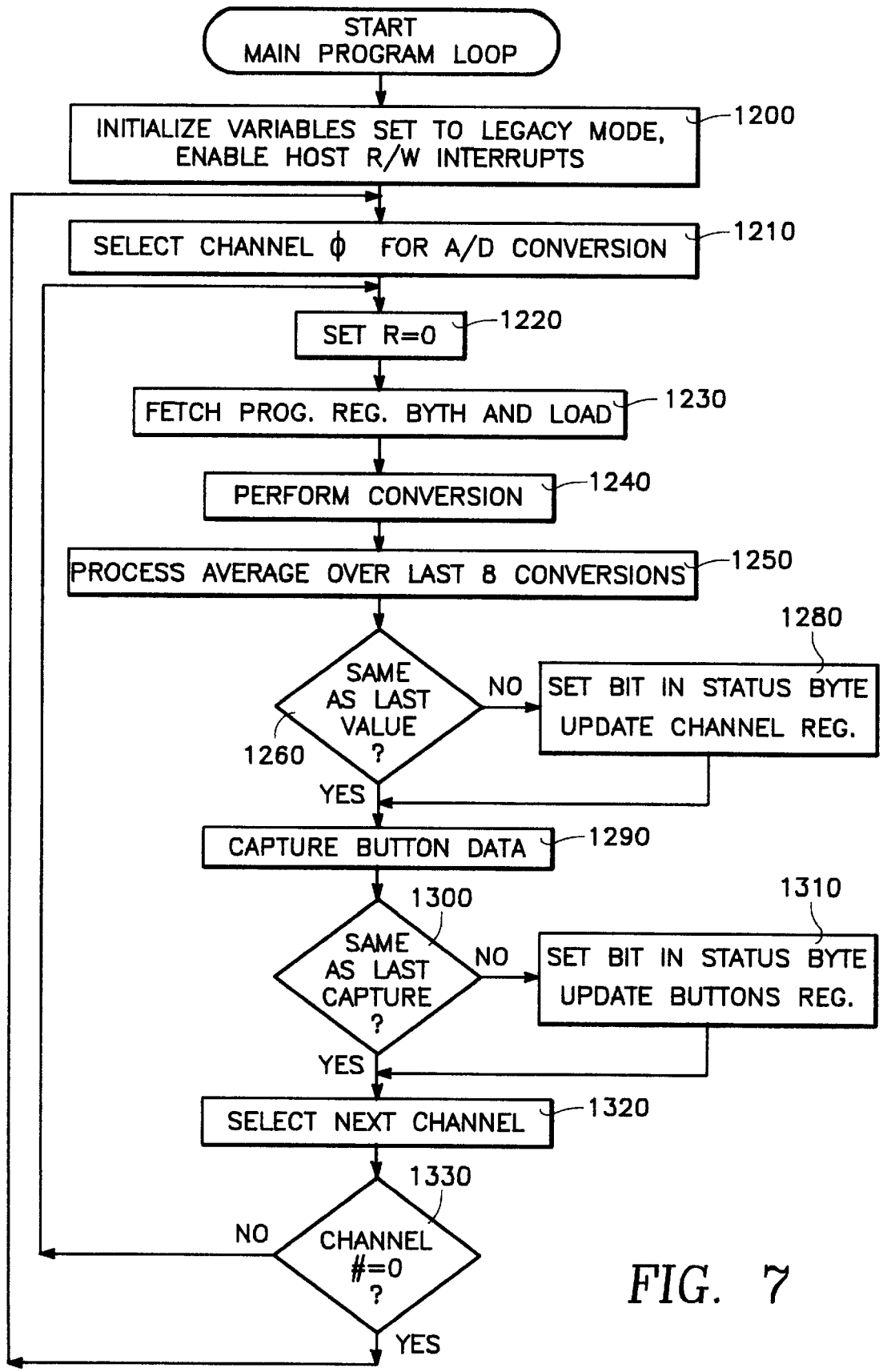
FIG. 7 is a flow diagram of the preferred main program carried out in the adapter card of FIG. 6.

Referring now to the main program of FIG. 7, the first step is to initialize variables and enable read and write interrupts from the host (block 1200 of FIG. 7). Initializing the variables preferably includes selecting the analog mode for the adapter card. Then, the first channel (channel 0) of the four wiper outputs from the adapter port 600 is selected (block 1210 of FIG. 7). Next, the programmable resistor value is set to zero (block 1220 of FIG. 7) in order to discharge any stray capacitance, for example in the multiplexer circuitry of FIGS. 4 and/or 5. Then, the processor 150 fetches the 8-bit resistor value stored in the axis calibration register 1010 corresponding to current channel number— e.g. channel 0— (block 1230 of FIG. 7). The analog-to-digital converter 165 performs the conversion (block 1240) and then an averaging/rounding operation is performed on the last eight digital samples of the current channel which have been stored in the eight registers 170 (block 1250) to achieve a new result. If the current result is not the same as the previous one (NO branch of block 1260), then one of eight status bits corresponding to the current analog channel in an eight-bit channel register 1270 of the processor 150 is set to a "true" state (block 1280 of FIG. 7). (The eight status bits in the channel register 1270 track four position wiper outputs and four button outputs of one joystick. A unique status byte is maintained by the processor 150 in memory for each joystick that is multiplexed to the adapter port 600 and is loaded into the channel register 1270 contemporaneously with the performance of the step of block 1230.) Otherwise, if the data is the same as the last sample (YES branch of block 1260), then the processor collects the four button outputs (block 1290).

A similar procedure is performed with the button data: If the data is not the same (YES branch of block 1300) as the previous sample of the button data for the current channel, then those status bits in the register 1270 corresponding to the change button data bits are set to a true state (block 1310 of FIG. 7). Otherwise (YES branch of block 1300), the channel number is incremented (block 1320). If the last channel has already been processed—so that the channel number has wrapped around to channel 0—(YES branch of block 1330), the program has finished one complete cycle and loops back to the step of block 1210. Otherwise (NO branch of block 1330), the program repeats the cycle—but with the next channel number—beginning with the step of block 1220.

Preferred Interrupt Service Routine for the Embodiment of FIG. 6

Figure 8A:
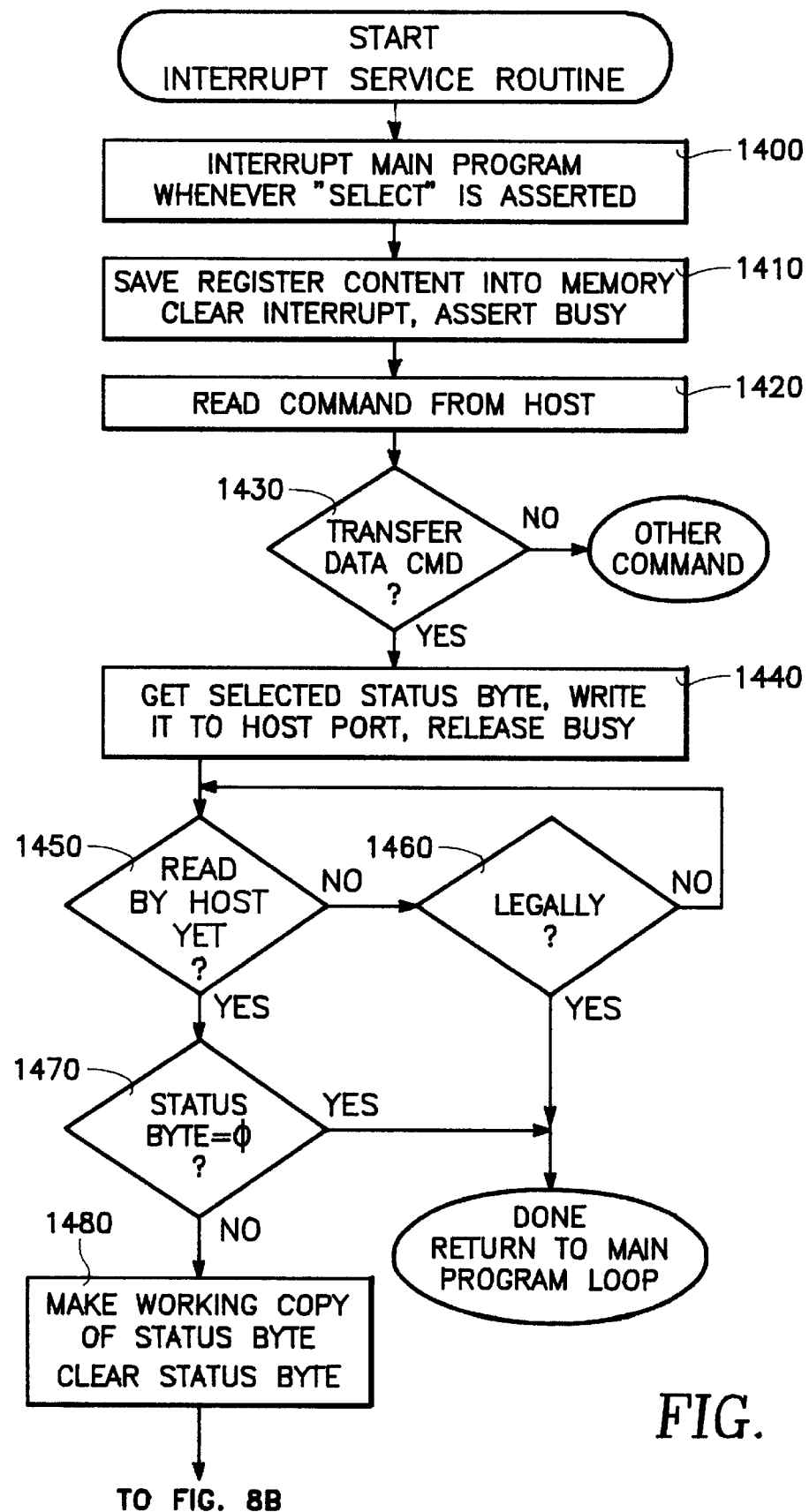
FIGS. 8A and 8B constitute a flow diagram of an interrupt service routine of the main program of FIG. 7.
Figure 8B:
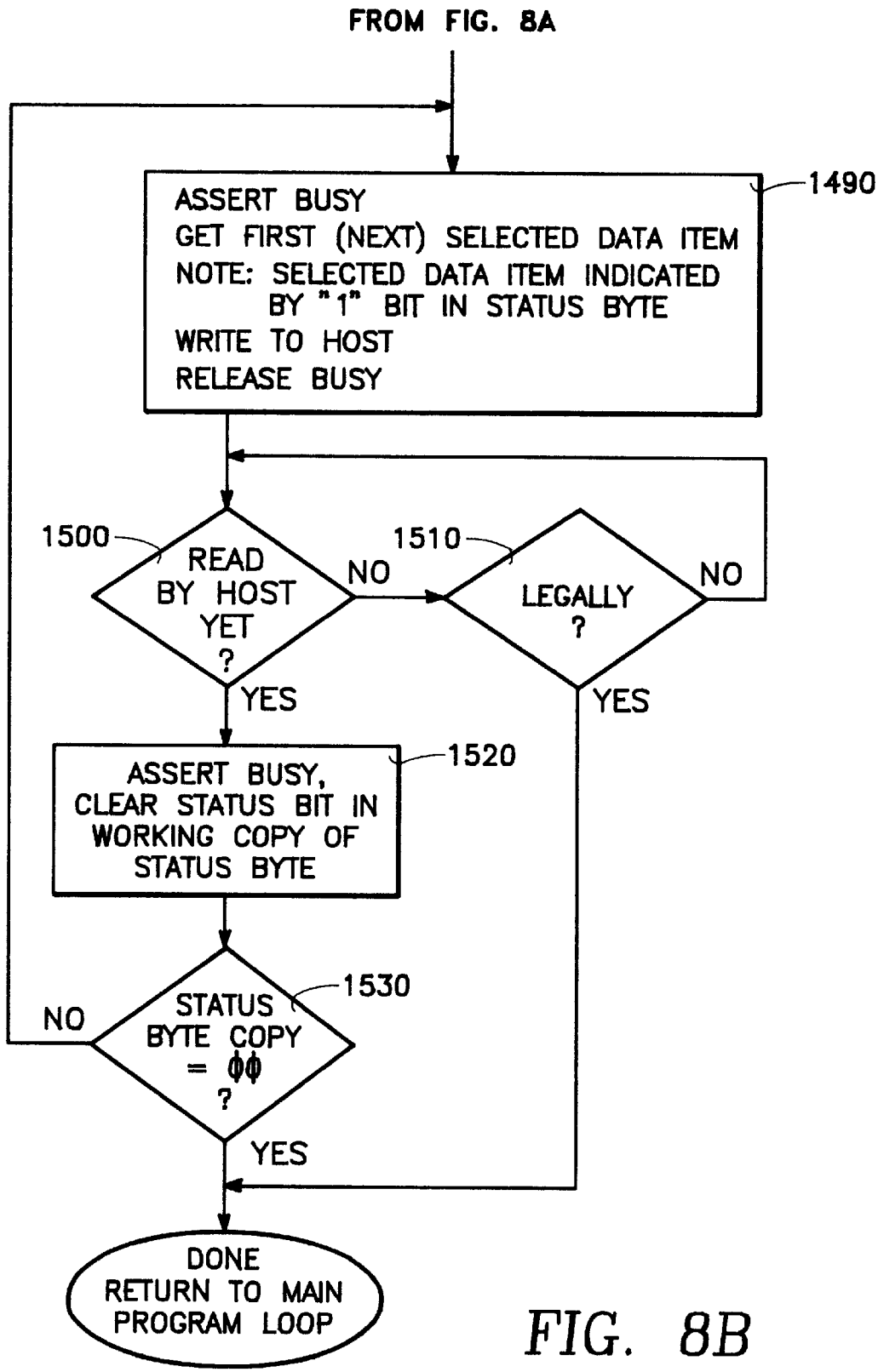

The interrupt service routine for the main program of FIG. 7 is illustrated in FIGS. 8A and 8B. The main program is interrupted whenever SELECT is asserted (block 1400 of FIG. 8A). The contents of the registers 170 are saved to memory, the interrupt is cleared and BUSY is asserted (block 1410 of FIG. 8A). The command is read from the host (block 1420), and it is either a transfer data command (YES branch of block 1430)—typically a command specifying which one of four joysticks 0–3 is to be read—or a housekeeping command (NO branch of block 1430)—such as a calibrate command or a joystick product identification. If it is a transfer data command, then the status byte corresponding to the channel number specified by the command is fetched and written to the data bus 20 (block 1440). While the processor 150 waits for a toggling of the interrupt signal signifying that the host has read the data (block 1450), it determines whether the analog mode word decoder 1100 has detected an assertion of the analog mode word by the host (block 1460). If so, the program returns to the main program (YES branch of block 1460). Otherwise, it waits until the host has read the data (YES branch of block 1450) and then determines whether the status byte now consists of all zeroes (block 1470). If so, the processor returns to the main program (YES branch of block 1470). Otherwise, a working copy of the status byte is stored in memory, and the status byte in the channel register 1270 is cleared in preparation for the next cycle (block 1480).

The next step (block 1490) is to assert BUSY and get the next data item (e.g., the next wiper output of the current joystick or the first wiper output of the next joystick); a "1" or true bit in the status byte indicates the next data item to be selected for the current joystick; the corresponding data is written to the data bus 20 and BUSY is released. The processor waits for the host to signal that it has read the data, as typically signified by the interrupt signal being toggled (block 1500) and in the meantime monitors the ANALOG MODE bit of the analog mode word decoder 1100 (block 1510). Assertion of the analog mode word causes the processor to terminate the interrupt service routine (YES branch of block 1510). Once the host as read the data (YES branch of block 1500), BUSY is asserted, the corresponding bit of the status byte is cleared (set to zero) in the working copy of the status byte (block 1520). Next, a determination is made whether all data for the current joystick has been transferred—i.e., whether the corresponding status byte working copy consists of all zeroes (block 1530). If not (NO branch of block 1530), the routine returns to the step of block 1490 to process data flagged by the next non-zero bit of the status byte. Otherwise (YES branch of block 1530), the interrupt service routine is terminated and the processor returns to the main program.

Figures 9, 11:
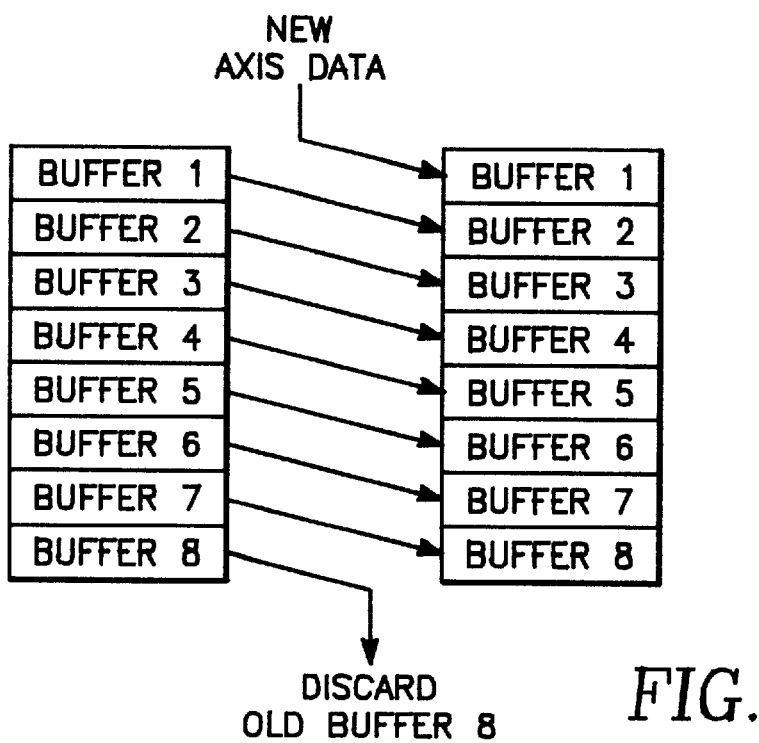
FIG. 9 is a table defining a status byte employed in the embodiment of FIGS. 6.
FIG. 11 illustrates a register shifting operation employed in the filtering process of FIG. 10.

The eight bits of the status byte are illustrated in FIG. 9 in tabular form for a preferred implementation in which the last three bits represent unused channels, there being only five used bits: X axis, Y axis, Z axis, R axis and buttons. A 1-bit signifies new or changed data requiring transfer to the host upon request.

Preferred Averaging and Round-Off Algorithm

Figure 10:
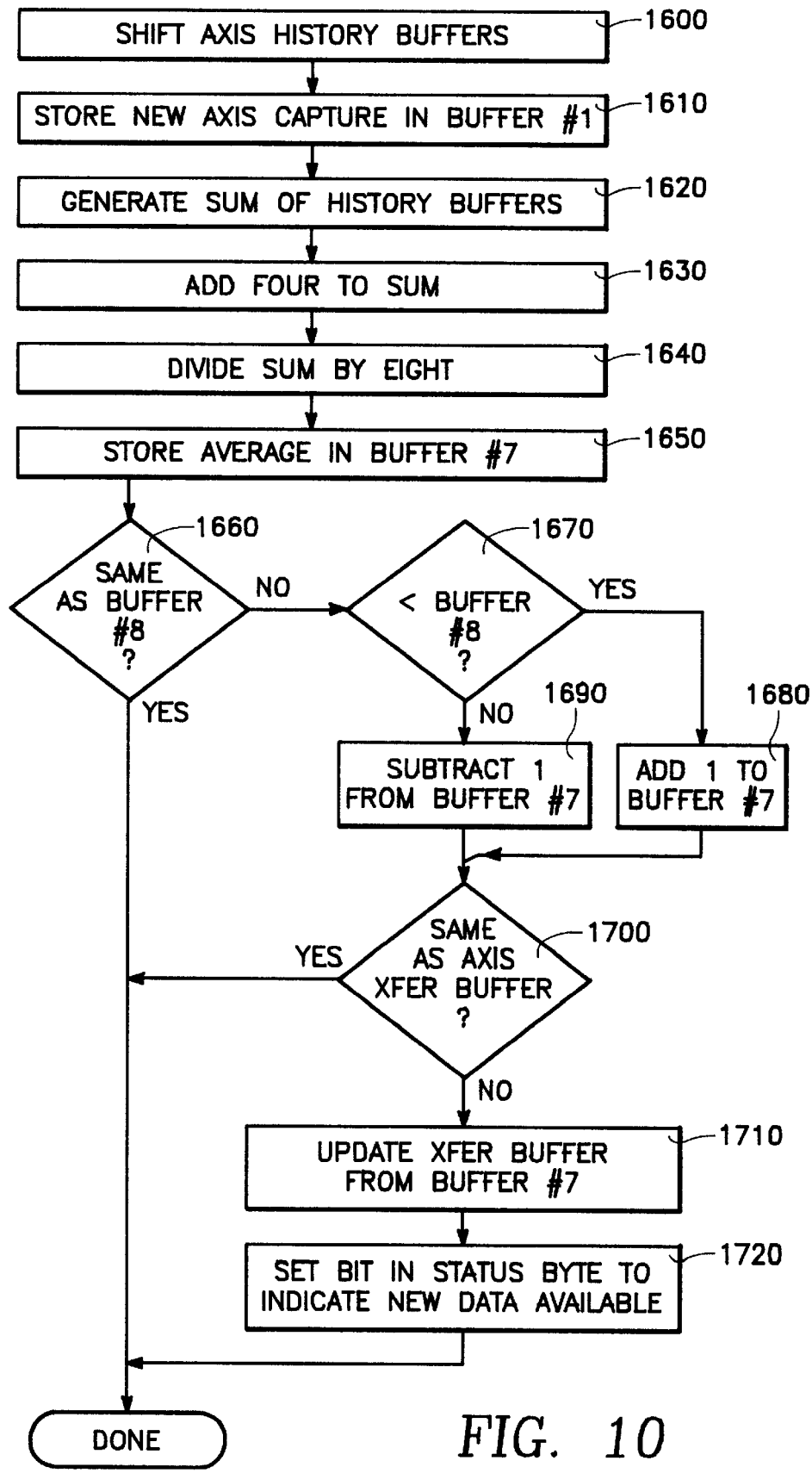
FIG. 10 is a flow diagram of a preferred analog to digital filtering processing employed in the embodiment of FIG. 6.

Block 1250 of the main program of FIG. 7 refers to processing the last eight conversions of the analog to digital converter 165. One such process is described above in this specification in which the average of the last eight average values is computed. However, the preferred process is simpler and more powerful insofar as it provides a more stable result (reducing or eliminating jitter) and is illustrated in FIG. 10. Much of the improvement relative to jitter is achieved by an intelligent rounding up/rounding down algorithm in addition to an intelligent averaging algorithm in which the last two samples (of the eight) are averages, while the first six are unprocessed.

Referring now to FIG. 10, the preferred filtering process begins by shifting the contents of the eight conversion sample registers 170 (block 1600 of FIG. 10). This step is illustrated conceptually in FIG. 11. Each of the eight registers or buffers 170 contains a corresponding one of the last eight conversions by the analog to digital converter 165. To make room for the next one, the contents are all shifted to the next highest-numbered register (buffer), the contents of register 8 being the oldest and therefore is discarded in this step. Register (buffer) 1 is now cleared to received the next conversion sample, which is now written there (block 1610).

The sum of the contents of the eight registers is computed (block 1620) and a "round-up" step is performed by adding one-half to each register prior to the computation or, equivalently and preferably, by adding four to the sum after its computation (block 1630). The average is computed by dividing the result by 8 (block 1640) and the resulting average value is stored in register 7 by writing over the prior contents of register 7 (block 1650). If the contents of registers 7 and 8 are the same (YES branch of block 1660), no further steps are taken (as there has been no change in the data. Otherwise (NO branch of block 1660), a round-up or a round-down operation is performed depending upon whether the new average stored in register 7 is less than or greater than the previous average stored in register 8. Specifically, if the new average is less than the old average (YES branch of block 1670), then 1 is added to the contents of register 7 (block 1680). Otherwise (NO branch of block 1670), 1 is subtracted from the contents of register 7 (block 1690). The result now stored in register 7 is compared with the last value transmitted on the data bus for the present axis of the joystick. If it is the same (YES branch of block 1700), no further action is taken. Otherwise (NO branch of block 1700), the contents of buffer 7 is latched at a convenient location for the next transfer to the data bus (block 1710), and the corresponding bit in the status byte is set to 1 (true) to indicate new data is available (block 1720).

Using Two Game Adapter Boards

Preferably, in the embodiment of FIG. 5, only four joysticks are multiplexed to the same adapter port 600, rather than the eight or sixteen joysticks suggested in this specification. In order to increase the number of joysticks in the system from four to eight, it is preferred that two adapter cards of the invention, each multiplexed with four joysticks, be employed. The following description concerns how to install two adapter cards in the system. The first adapter card is as described in FIG. 6, in which assertion of A5 on the data bus by the host computer selects the digital mode, while the assertion of A4 selects the analog mode. A second adapter card is installed and connected to the host bus interface in the same manner. This second card is identical to the embodiment illustrated in FIG. 6, except that its digital mode word is A6, and furthermore it does not support the analog mode. Thus, the host can select the first adapter card by asserting A4 (for analog mode) or A5 (for digital mode) or the host can select the second adapter card—for digital mode only—by asserting A6.

The host can test for the presence of either or both of the adapter cards by selecting the desired board (by asserting the digital mode word A5 or A6) and then reading the READY bit or bit zero of the data bus. If the READY bit is true (low), the selected board is present, and otherwise it is absent.

More adapter cards can be added by specifying more digital mode words, e.g., A7, A8 and so forth, for the additional adapter cards. In fact, the number of adapter card is limited only by the P.C.'s expansion capabilities.

Advantages of the Invention

1. Reliable Selection of the Digital and Analog Modes:

The combination of the analog mode logic circuit 55 and the state machine 65 assures that data transfer with the host CPU is in the mode (either digital or analog) required by the game software package currently running on the host CPU, and only when data transfer has been requested by the host CPU. For this purpose, the state machine 65 (and specifically the digital mode logic circuit 50) initiates preparation for data transfer only if the correct device address of the game adapter card has been received on the address bus 35 and recognized by the device address decoder 40. The digital mode logic circuit 50 informs the analog mode logic circuit of such an event by raising the D.A. RECVD flag to the analog mode logic circuit. In response, the analog mode logic circuit 55 senses (through the digital mode word decoder 45) whether the host CPU has authorized the digital mode of operation by the game adapter card 10 by transmitting the digital mode word on the data bus 25 contemporaneously with the transmission of the device address on the address bus 35. The analog mode logic circuit 55 informs the digital mode logic circuit 50 of such an event by raising the ENABLE flag to the digital mode logic circuit 50, thereby causing the digital mode logic circuit 50 to initiate preparation for the microcontroller 60 to perform data transfer over the data bus 25. Otherwise, if the digital mode word was not so transmitted, then the ENABLE flag is not raised, in which case the digital mode logic circuit 50 is not activated (thus continuing to prevent the microcontroller 60 from performing data transfer) and the analog mode logic circuit 55 takes control to perform the analog mode operations described above. The analog mode of operation is thus, in effect, a default mode of the dual mode game adapter card 10, thus assuring that the high speed digital mode of operation is not used unless the CPU is running a game software package that specifically calls for the digital mode.

An additional safeguard built into the game adapter card 10 is that the microcontroller 60 stops the digital mode of operation in order to return the game adapter card to its default analog mode each time a data transfer with the host CPU has been completed. Thus, the host CPU must assert the digital mode word each time it requires a digital mode data transfer. This safeguard is carried out by the microcontroller asserting the RESUME flag to the analog mode logic circuit 55 at the end of each data transfer. This causes the analog mode logic circuit 55 to withdraw the ENABLE flag it previously raised to the state machine 65. The state machine 65 is thus de-activated and so the game adapter card 10 reverts to its default analog mode.

A further safeguard is built into the game adapter card 10 in that, while the analog mode is effectively the default mode, the analog switch 90 prevents connection of the joystick wiper output 85 to the analog timer 100 (thus preventing analog mode operation) unless or until the host CPU raises the WRITE flag on the host bus interface 15. Provided that the game adapter card 10 is to operate in the analog mode (i.e., because the digital mode word has not been asserted with the game adapter card's device address), the WRITE flag from the host CPU raises the analog write (AWR) flag from the analog mode logic 55 to trigger the analog timer 100, immediately raising its Q output to the tri-state buffer 115, which is fed back to toggle the analog switch from its normally closed position, thereby connecting the joystick wiper output 85 to the T input of the analog timer 100.

2. Dual Use of the READ and WRITE strobes from the CPU:

The game adapter card 10 exploits the WRITE and READ strobes received from the host CPU on the host bus interface 15 in both the analog mode and the digital mode: (a) in the analog mode, the WRITE and READ strobes are processed in the conventional manner in that the WRITE strobe raises the AWR flag to trigger the analog timer 100, causing the timer 100 to release the capacitor 110 to permit it to charge up at the T input while simultaneously raising the Q output to a high state until the capacitor voltage reaches a predetermined level, while the READ strobe periodically enables the tri-state buffer 115 to read the analog timer Q output to the data bus, the length of the high state of the Q output being a measure of the joystick resistance and therefoee of the joystick position; (b) in the digital mode, either the READ flag or the WRITE flag causes the digital mode logic circuit 50 to raise the digital read or write (DR/W) flag to the state machine logic 70, thus enabling the state machine protocol controlling digital mode data transfer by the microcontroller 60, while the microcontroller 60 distinguishes between the READ flag and the WRITE flag in order to determine whether to perform a write operation to receive data from the data buses 20 or a read operation to transmit data from the registers 170 to the data bus 20.

3. Providing for Asynchronous Data Transfer:

The state machine 65 described above enables asynchronous data transfer between the microcontroller 60 and the host CPU over the data bus 25. In other words, the microcontroller 60 does not need to be synchronized or with (receive timing signals from) the host CPU, a significant advantage. Thus, for example, within the microcontroller 60 the sampling rate of the ADC 165 and the timing of data transfer from the ADC 165 to the storage registers 170 does not directly affect the host CPU, greatly simplifying the task of coordination between the game adapter card 10 and the host CPU.

4. Preventing Unnecessary Digital Mode Data Transfers:

The operation of the state machine 65 prevents unnecessary digital mode read data transfers from the microcontroller 60 to the host CPU. As described above with reference to FIG. 3, the microcontroller 60 always determines whether the latest averaged analog value in the registers 170 represents a change from the previous one. If not, it asserts the BUSY flag to the state machine 65, causing the state machine to prevent a read data transfer from the microcontroller 60 to the host CPU. The host CPU is informed whether the microcontroller has new data available to be read by periodically setting the READY flag on bit 0 of the data bus 20 to one of two predetermined values (e.g., logic 0 for "not ready" and logic 1 for "ready").

5. Dual Use of the Data Bus Bit Zero:

Although the state machine 65 uses the least significant bit (i.e., bit 0) of the data bus 20 as the READY flag to inform the host CPU whether or not the microcontroller has new information to be read, it does not monopolize this bit. Instead, the READY flag is asserted on the data bus bit zero only while a READ or WRITE flag is asserted by the host CPU (i.e., while the DR/W flag is asserted in the state machine 65). At all other times, the data bus is not used for the READY flag and therefore is available for data transfer. Since the host CPU does not transfer data simultaneously with asserting a READ or WRITE flag, use of the data bus bit zero as the READY flag for such a limited duration does not interfere with actual data transfer on the bus.

6. Continual Ouiescent ADC Sampling:

The game adapter card 10 is in a quiescent period between successive data transfer operations. In each quiescent period (between successive data transfer operations in either the digital mode or the analog mode), the microcontroller 60 is kept in continual readiness for instant data transfer of the latest joystick position data without having to wait for the ADC 165 to perform a last-minute sampling operation or any other task, a significant advantage. This is accomplished by: (a) the analog switch 90 having a normally closed position connecting the joystick wiper output 85 to the microcontroller 60 (through the voltage shifter 95) during the entire quiescent period, and (b) having the microcontroller continually polling the output(s) of the joystick so that the ADC 165 continually supplies the latest joystick position values to the registers 170 during the quiescent period. As a result, at the beginning of any data transfer operation, the registers 170 always contain the latest averaged position value(s). The length of time required to poll plural joystick outputs or the length of time required to perform the averaging over N prior ADC sample periods does not affect the speed with which the microcontroller 60 responds to a host CPU requests to read the latest joystick position (or button) data.

7. Noise filtering by averaging algorithm:

The averaging algorithm performed by the microcontroller 60 on successive ADC output digital values, as described previously in this specification, suppresses noise and also eliminates spurious variations in current average values from old ones and therefore eliminates spurious indications (via the BUSY flag) that the microcontroller is ready for data transfer.

While the invention has been described in detail with reference to preferred embodiments, it is understood that variations and modifications thereof may be made without departing from the true spirit and scope of the invention.

What is claimed is:

1. An adapter card for interfacing between a host bus of a host central processing unit (CPU) and an analog output device comprising a variable resistor having a bias voltage input and a wiper output, said adapter card comprising:

a programmable resistor connected in series between said wiper output of said analog output device and a voltage return terminal;

an analog-to-digital converter (ADC) having a digital output and an analog input coupled to a connection point between said wiper output and said programmable resistor;

a processor apparatus coupled to said programmable resistor and to said analog-to-digital converter and adapted to:
    (a) provide data transfer from said digital output to said host bus, and
    (b) program the resistance of said programmable resistor in accordance with a predetermined divider resistor value of said wiper output.

2. The adapter card of claim 1 wherein said joystick has plural wiper outputs matched by respective plural optimal divider resistor values, said card further comprising:

a multiplexer for successively connecting each of said plural wiper outputs to said programmable resistor in series; and plural resistor value storage locations adapted to hold respective ones of said plural optimal divider resistor values, wherein said processor apparatus is adapted to program said programmable resistor with successive ones of said divider resistor values from said plural storage locations in synchronism with said multiplexer successively connecting said plural wiper outputs.

3. The adapter card of claim 1 wherein said adapter card further comprises:

a multiplexer for connecting wiper outputs of different analog output devices to said programmable resistor, said different analog output devices being matched by different optimal divider resistor values;

plural resistor value storage locations adapted to hold respective ones of said optimal divider resistor values, wherein said processor apparatus is adapted to program said programmable resistor with successive ones of said divider resistor values from said plural storage locations in synchronism with said multiplexer successively connecting said programmable resistor to a wiper output of a successive one of said different analog output devices.

4. The adapter card of claim 1 wherein said processor comprises:

a storage register for receiving digital values resulting from said digital output of said analog-to-digital converter;

a controller controlling said storage register independently of said host CPU for performing data transfer from said storage register to said host bus, said controller being responsive to a data transfer request from said host CPU for issuing a transfer ready acknowledgement; and a state machine for enabling said controller to perform said data transfer following a data transfer request from said host CPU and a corresponding transfer ready acknowledgement from said controller.

5. The adapter card of claim 4 wherein said controller issues said transfer ready acknowledgement provided that a current digital value in said storage register represents a change from its antecedent.

6. The adapter card of claim 5 wherein said state machine transmits a ready bit on said host bus contemporaneous with said data transfer request, said ready bit having a binary value representing the status of said of said transfer ready acknowledgement of said controller.

7. The adapter card of claim 4 wherein said processor and said controller are comprised together in a microprocessor and wherein said microprocessor, said ADC and said storage register are comprised together in a microcontroller.

8. The adapter card of claim 1 further comprising a device address decoder having an input port connected to said bus and an output flag bit connected to said state machine, said device address decoder setting said output flag bit in response to receipt on said host bus of a correct device address of said adapter card, and wherein said state machine refrains from enabling data transfer by said controller without a setting of said output flag bit.

9. The adapter card of claim 1 wherein said programmable resistor comprises:

a plurality of N resistors connected in series and where the $n^{th}$ one of said resistors has a resistance of $r2^n$, r being the resolution of said programmable resistor;

a plurality of N shunt switches connected across respective ones of said N resistors; and an N-bit counter having its outputs connected to corresponding ones of said switches, said N-bit counter having an input connected to said controller.

10. The adapter card of claim 1 further comprising a voltage shifter for shifting to about zero volts a minimum voltage of said connection point between said wiper output and said programmable resistor, and wherein said predetermined minimum digital value is nearly equal to but greater than zero.

11. The adapter card of claim 1 further comprising:
a timer having a timer input and a timer output for producing a pulse signal at said timer output having a length corresponding to a resistance applied to said timer input;
an analog/digital mode switch between said analog output device wiper output and said connection point to said programmable resistor, said analog/digital mode switch having a first position connecting said wiper output to said connection point with said programmable resistor and a second position connecting said wiper output to said timer circuit;
an analog output switch connecting said timer output to said host bus; and
a prohibit function responsive in the absence of a predetermined digital mode word on said host bus for prohibiting said processor from providing data transfer from said digital output, for triggering said timer and for activating said analog output switch.

12. The adapter card of claim 11 wherein said analog/digital mode switch is normally in said first position, said adapter card further comprising a feedback connection from said timer output to a toggle input of said analog/digital mode switch for moving said analog/digital mode switch to said second position whenever said timer is triggered.

13. The adapter card of claim 11 wherein said prohibit function is responsive to the presence of said predetermined digital mode word on said host bus for enabling said state machine while disabling said analog output switch.

14. The adapter card of claim 13 further comprising a resume logic signal output from said processor to said prohibit function upon completion of each data transfer by said processor, said prohibit function being responsive to said resume logic signal to disable said processor from providing data transfer.

15. The adapter card of claim 14 wherein said prohibit function comprises:
an analog mode logic circuit having an analog write output connected to a trigger input of said timer asserted with a write signal of said host CPU, an analog read output connected to a control input of said analog output switch asserted with a read signal of said host CPU, and an enable output connected to said state machine for enabling said state machine with assertion of said digital mode word, a resume input for receiving said resume logic signal and a digital mode word flag input; and
a digital mode word decoder having an input connected to said host bus and an output bit connected to said digital mode word flag input.

16. The adapter card of claim 1 wherein said processor is further adapted to increment the resistance of said programmable resistor whenever said digital output falls below a predetermined minimum digital value.

17. The adapter card of claim 16 wherein said adapter card has a digital mode and an analog mode and wherein said processor has an inhibit input connected to said feedback connection for inhibiting the incrementing of said programmable resistor whenever said adapter card is in said analog mode.

18. A multiple analog output device system for simultaneously interfacing a plurality of as many as N analog output devices with a host bus of a host central processing unit (CPU), each analog output device comprising a variable resistor having a bias voltage input and a wiper output, said system comprising:
a card adapter comprising:
a analog output device terminal and a voltage return terminal and a programmable resistor connected in series between said analog output device terminal and said voltage return terminal;
an analog-to-digital converter (ADC) having a digital output and an analog input coupled to a connection point between said analog output device terminal and said programmable resistor;
a multiple analog output device controller comprising:
an output connected to the analog output device terminal of said adapter card;
an N:1 multiplexer having N data inputs, plural address inputs and a single output, said N inputs being individually connectable to respective wiper outputs of said N analog output devices and means for connecting one of said data inputs specified by said plural address inputs to said single output; and
a cluster microcontroller for generating a sequence of address bytes applied to said plural address bits of said N:1 multiplexer.

19. The apparatus of claim 18 further comprising:
a processor adapted to:
(a) provide data transfer from said digital output to said host bus, and
(b) program the resistance of said programmable resistor in accordance with a predetermined divider resistor value of said wiper output.

20. The system of claim 18 wherein said processor comprises:
a storage register for receiving digital values resulting from said digital output of said analog-to-digital converter;
a controller controlling said storage register independent of said host CPU for performing data transfer from said storage register to said host bus, said controller being responsive to a data transfer request from said host CPU for issuing a transfer ready acknowledgement; and
a state machine for enabling said controller to perform said data transfer following a data transfer request from said host CPU and a corresponding transfer ready acknowledgement from said controller.

21. The system of claim 20 wherein each analog output device comprises four independent wiper outputs and wherein said adapter card comprises four analog output device terminals and four programmable resistors connectable thereto, said multiple analog output device controller comprising:
a total of four outputs individually connected to said four analog output device terminals of said adapter card;
a total of four N:1 multiplexers each having N data inputs, plural address inputs and a single output, said N inputs of each of said four N:1 multiplexers being individually connectable to a respective one of the four wiper outputs of respective ones of said N analog output devices, each N:1 multiplexer comprising means for connecting one of said data inputs specified by said plural address inputs to said single output.

22. The system of claim 21 wherein each analog output device comprises four independent button outputs and wherein said adapter card comprises four button terminals, said multiple analog output device controller further comprising:
a total of four button outputs individually connected to said four button terminals of said adapter card;

a total of four N:1 button multiplexers each having N data inputs, plural address inputs and a single output, said N inputs of each of said four N:1 button multiplexers being individually connectable to a respective one of the four button outputs of respective ones of said N analog output devices, each N:1 button multiplexer comprising means for connecting one of said data inputs specified by said plural address inputs to said single output.

23. An adapter card for interfacing between a host bus of a host central processing unit (CPU) and an analog output device having a potentiometer wiper output, said adapter card comprising:

an analog-to-digital converter (ADC) having a digital output and an analog input coupled to said wiper output;

means for providing data transfer from said digital output to said host bus comprising:

a storage register for receiving digital values resulting from said digital output of said analog-to-digital converter;

processor means for performing data transfer from said storage register to said host bus and for refraining from performing said data transfer unless a current digital value in said storage register represents a change from its antecedent.

24. The adapter card of claim 23 wherein said analog output device has plural wiper outputs, and wherein said processor means comprises means for sequentially polling said wiper outputs to said analog-to-digital converter in between successive data transfers.

* * * * *